United States Patent [19]
Yamada et al.

[11] Patent Number: 5,327,517
[45] Date of Patent: Jul. 5, 1994

[54] GUIDED-WAVE CIRCUIT MODULE AND WAVE-GUIDING OPTICAL COMPONENT EQUIPPED WITH THE MODULE

[75] Inventors: Yasufumi Yamada, Mito; Fumiaki Hanawa, Hitachiota; Kuniharu Kato, Naka; Yasuyuki Inoue, Mito; Masayuki Okuno, Mito; Toru Maruno, Tokorozawa; Tetsuo Yoshizawa, Mito; Takao Kimura, Hitachi, all of Japan

[73] Assignee: Nippon Telegraph and Telephone Corporation, Tokyo, Japan

[21] Appl. No.: 923,777

[22] Filed: Aug. 3, 1992

[30] Foreign Application Priority Data

| Aug. 5, 1991 | [JP] | Japan | 3-195485 |
| Sep. 6, 1991 | [JP] | Japan | 3-227332 |
| Mar. 13, 1992 | [JP] | Japan | 4-055335 |
| Jun. 15, 1992 | [JP] | Japan | 4-155387 |
| Jun. 15, 1992 | [JP] | Japan | 4-155388 |

[51] Int. Cl.$^5$ .................................. G02B 6/36
[52] U.S. Cl. ........................... 385/137; 385/50; 385/51
[58] Field of Search .............. 385/4, 49, 50, 51, 137, 385/88–92

[56] References Cited

U.S. PATENT DOCUMENTS

| 4,373,778 | 2/1983 | Adham | 385/91 X |
| 4,647,147 | 3/1987 | Pikulski et al. | 385/91 X |
| 4,729,618 | 3/1988 | Yoshida et al. | 385/49 X |
| 4,976,506 | 12/1990 | Pavlath | 385/49 X |
| 5,015,059 | 5/1991 | Booth et al. | 385/49 |
| 5,054,870 | 10/1991 | Lösch et al. | 385/14 |
| 5,076,654 | 12/1991 | Presby | 385/129 |

FOREIGN PATENT DOCUMENTS

| 62-73208 | 4/1987 | Japan. | |
| 63-291010 | 11/1988 | Japan | 385/49 |
| 1-96607 | 4/1989 | Japan | 385/49 |
| 1-234806 | 9/1989 | Japan | 385/49 |

OTHER PUBLICATIONS

Journal of Lightwave Technology, vol. 61, No. 6, Jun. 1988; IEEE; "Fiber Attachment for Guided Wave Devices", Edmund J. Murphy, pp. 826–871.

Journal of Lightwave Technology, vol. Lt-3, No. 4, Aug. 1985, IEEE; "Permanent Attachment of Single-Mode Fiber Arrays to Waveguides", Edmond J. Murphy, et al., pp. 795–799.

Optical Engineering, vol. 31, No. 1, Jan. 1992; "Packaging of glass waveguide silicon devices"; Herman M. Presby, et al., pp. 141–143.

Primary Examiner—John D. Lee
Attorney, Agent, or Firm—Spencer, Frank & Schneider

[57] ABSTRACT

A guided-wave circuit module includes a guided-wave circuit chip having an input waveguide part and an output waveguide part at the ends thereof, a guided-wave circuit part having a predetermined function and positioned between the input waveguide part and the output waveguide part; and a holder for supporting the guided-wave circuit chip, wherein the guided-wave circuit part of the guided-wave circuit chip does not come in contact with the chip holder; at least part of the input and output waveguide parts of the guided-wave circuit chip is fixed to the holder with a fixing agent; and the packaged chip does not have a warp which leads to deterioration of characteristics. A fixing agent having a high hardness is applied to the periphery of the endfaces of the input and output waveguide parts of the guided-wave circuit module and to the periphery of the fiber endfaces of the optical fiber array connected to the module. Therefore, these endfaces can accurately be polished and the waveguide can be connected to the optical fibers at a sufficiently low fiber connection loss and a high return loss.

22 Claims, 27 Drawing Sheets

GUIDED-WAVE CIRCUIT MODULE AND WAVE-GUIDING OPTICAL COMPONENT EQUIPPED WITH THE MODULE

BACKGROUND OF THE INVENTION

1. Field of the Invention

The present invent ion relates to a guided-wave circuit module and a wave-guiding optical component obtained by connecting optical fibers to the guided-wave circuit module which are used in the field of the optical communication and more specifically to a guided-wave circuit module and wave-guiding optical component designed such that a guided-wave circuit on a guided-wave circuit chip incorporated into a holder can exhibit the characteristic properties thereof.

2. Description of the Prior Art

Development of a variety of high-quality guided-wave circuits such as light-splitters, optical wavelength multi-demultiplexers and optical switches in addition to the conventional light sources, optical fibers and photodetectors has been desired as optical communication technique has been advanced. Moreover, these guided-wave circuits are required to have a large scale and high functionality, in addition to reduction of insertion loss and reflection at the connected interface between a waveguide and an optical fiber, and improvement in the heat stability. For these reasons, a guided-wave circuit has a size extending over the entire surface of a substrate having a diameter of 3 to 5 inches, and must accurately control the phase of propagating light rays.

In order to satisfy these requirements, it is important not only to improve characteristic properties of a guided-wave circuit chip per se, but also to optimize the structure of a guided-wave circuit module which supports the chip and to which an optical fiber is connected and, hence, providing the structure of a wave-guiding optical component obtained by connecting the guided-wave circuit module to an optical fiber. More specifically, there has been a requirement for the development of a guided-wave circuit module and a wave-guiding optical component which satisfies the following four requirements, i.e., (1) accurate alignment of a waveguide with respect to a fiber; (2) accurate polishing of the endfaces of waveguides and fibers; (3) fitting of a guided-wave circuit chip to a holder without applying any stress to the chip; and (4) high mechanical strength. In particular, in the case of the foregoing guided-wave circuit module comprising a large scale substrate, the substrate inevitably warps. Thus, it is very important to support the substrate with a holder so that any stress is not applied thereto irrespective of the presence of any warp.

Further, in case of guided-wave circuits having active functions such as guided-wave circuits which make use of refractive index change of the guided-wave circuits due to a temperature change, i.e., the thermo-optics effect and hybrid guided-wave circuits in which semiconductor devices are mounted on the substrate thereof, the guided-wave circuit chip must have good heat radiation capacity in addition to the foregoing four requirements.

An example of the structure of a conventional guided-wave circuit module will be given below and problems associated therewith will also be discussed in detail below.

FIG. 1 shows an example of a typical conventional guided-wave circuit module (See E. J. Murphy et al., "Permanent attachment of single-mode fiber arrays to waveguides", IEEE, J. Lightwave Tech., LT-3, PP. 795–799, 1985). This module has a structure in which presser plates 3 are positioned on both upper edges of a guided-wave circuit chip 1 to connect optical fibers 2 and optical fiber arrays 4 are connected on both endfaces thereof to fix the optical fibers.

This structure for connecting optical fibers has a simple structure and, therefore, there has been widely used. According to this structure, it is possible to precisely align optical fibers 2 with respect to guided-wave circuits (guided-wave circuit part) 5. Moreover, the structure can easily be incorporated into the guided-wave circuit chip without applying any stress to the chip by using a small-sized guided-wave circuit whose warp can be neglected.

However, this structure has a low mechanical strength since guided-wave circuit chip 1 is exposed. In particular, in case of guided-wave circuit which is formed on a silicon (Si) substrate, the guided-wave circuit chip would easily be damaged and, thus, the reliability of the guided-wave circuit module is impaired. On the other hand, a large scale guided-wave circuit chip inevitably warps in not only the longitudinal direction but also the lateral direction. If this structure is applied to such a large scale chip, the warp in the lateral direction must be eliminated in order to fit presser plates 3 to the chip. For this reason, a great stress is applied to guided-wave circuit part 5 after the packaging thereof and accordingly the characteristic properties of the resulting guided-wave circuit are impaired.

On the other hand, Japanese Patent Application Laying-open No. 73208/1987 discloses a guided-wave circuit module having a structure in which a guided-wave circuit chip is not exposed. This module has a structure in which a guided-wave circuit chip 1 is sandwiched between two sheets of planar mounting substrates 6 and 7 and fixed thereto with an adhesive 8 to provide a guided-wave circuit chip unit 9 having unexposed surfaces of the chip as shown in FIG. 2 and in which two optical fiber arrays 4 for fixing optical fibers 2 are connected to both ends of unit 9 as shown in FIG. 3. If a guided-wave circuit module is designed to have such a structure, guided-wave circuit chip 1 is not exposed. Thus, the possibility of breakage of the guided-wave circuit chip associated with the module as shown in FIG. 1 would be substantially reduced.

However, when producing this structure, adhesive 8 must be applied to the whole surface of guided-wave circuit chip 1 to fix the chip to planar mounting substrates 6 and 7, stress caused by shrinkage of the adhesive during hardening is applied to the guided-wave circuit and, as a result, the characteristic properties of the guided-wave circuit vary after the chip is packaged. In particular, when guided-wave circuit chip 1 has a warp of a finite radius of curvature, the warp of the chip must be removed to sandwich guided-wave circuit chip 1 between planar mounting substrates 6 and 7. This results in the application of a large stress to guided-wave circuit chip 1. Moreover, if there is a difference in the linear expansion coefficient between planar mounting substrates 6, 7 and guided-wave circuit chip 1, stress is applied to guided-wave circuit chip 1 upon changes in the environmental temperature and, accordingly, characteristic properties of the chip are sufficiently affected by the environmental temperature change.

Structures similar to that of the module shown in FIG. 2 are disclosed in Herman M. Presby, Christopher A Edwards, "Packaging of glass waveguide silicon devices", Optical Engineering, 31 (1) , pp. 141-143 (January, 1992) and U.S. Pat. No. 5,076,654 entitled "Packaging of Silicon Optical components", Herman M. Presby, filed on Oct. 29, 1990. The article and the patent disclose packaged structures in which a UV-curable adhesive is applied onto the entire surface of a guided-wave circuit chip and a quartz cover is adhered to the upper surface of the chip through the adhesive layer. This structure suffers from the same problem discussed above in connection with the module shown in FIG. 2.

FIG. 4 shows an example of a module structure which allows self-aligning fiber connection between optical fibers 2 and guided-wave circuit chip 1 (see Japanese Patent Application Laying-open No. 234806/1988). To produce this module, level differences 1a for fiber alignment are first formed at both sides of guided-wave circuit chip 1 and a guided-wave circuit 5 is formed on the convex portion 1b existing between these level differences 1a (the central portion). On the other hand, a concave portion 10b, having a size corresponding to that of convex portion 1b, is formed on the side of mounting substrate 10 and the foregoing convex portion 1b is fitted in concave portion 10b. In this module, optical fibers 2 are connected to guided-wave circuit 5 of guided-wave circuit chip 1 through the self-aligning fiber connection. According to this module structure, guided-wave circuit chip 1 is fixed to mounting substrate 10 through the contact between level difference 1a on which any guided-wave circuit is not formed and mounting substrate 10. Accordingly, the shrinkage stress due to the hardening of a fixing agent, such as an adhesive or a solder, is not directly applied onto guided-wave circuit 5.

This packaging structure certainly makes it possible to save time required for aligning optical fibers 2 and guided-wave circuit chip 1, but the accuracy of fiber alignment is determined by the processing accuracy of level difference 1a of chip 1, or that of convex portion 1b of chip 1 and that of concave portion 10b on mounting substrate 10. The accuracy of fiber alignment thus achieved is in the order of 3 to 5 μm while taking into consideration the production yield and the fiber connection loss is as much as 0.5 to 1 dB. Further, when packaging a guided-wave circuit chip having a warp of a finite radius of curvature, the chip must be fixed to a frame after eliminating the warp thereof. This is because, if the chip is mounted on the frame while remaining the warp of the chip, correct alignment between the fibers and the guided-wave circuit is not ensured at the edges of the guided-wave circuit. In other words, shrinkage stress caused by the hardening of a fixing agent is not directly applied to the guided-wave circuit, but a large stress generated by eliminating the warp of the chip is applied to guided-wave circuit chip 1. This leads to a significant variation in characteristic properties of guided-wave circuit 5.

As has been described above, it is difficult to package conventional structures of guided-wave circuit modules without applying stress to the guided-wave circuit chip, in particular to a large scale chip whose warp cannot be neglected. Thus, conventional techniques cannot provide a guided-wave circuit module structure which can satisfy all of the following requirements: accurate alignment between fibers and waveguides; support of a chip without applying any stress; and achievement of high mechanical strength.

Moreover, conventional techniques suffer from a common problem of accurate polishing of endfaces. More specifically, glass, silicon and metals, which are principal materials for forming guided-wave circuit modules and optical fiber arrays, have Young's moduluses of the order of $10^3$ to $10^6$ kg/mm$^2$ which is 1 to 5 orders of magnitude higher than those of adhesives, such as typical fixing agents, which are used for fixing a guided-wave circuit to a mounting substrate. The guided-wave circuit module is constructed from a plurality of materials having different Young's moduli. When polishing the endfaces of a guided-wave circuit module and an optical fiber array in which a conventional typical fixing agent (adhesive) is used, the layer of the fixing agent having a low Young's modulus is first selectively ground and removed. Accordingly, the guided-wave circuit chip having a high Young's modulus, the optical fibers and terminal holders are exposed. If the polishing operation is further continued, the endfaces of the guided-wave circuit and the optical fibers are often damaged caused by abrasive particles which stay in recesses remaining after removal of the fixing agent. As has been discussed above, the polishing of the endfaces of guided-wave circuits having conventional structures and optical fibers leads to breakage of the guided-wave circuit chip and formation of defects on the polished endfaces. Therefore, good connection of endfaces cannot be ensured and, correspondingly, the fiber connection loss increases and the return loss deteriorates.

The conventional techniques also suffer from another common problem, that is, they do not provide any way for radiating heat from the guided-wave circuit chip. Therefore, it is difficult to apply the conventional technique to components which makes use of therm-optics effect and hybrid guided-wave circuits.

SUMMARY OF THE INVENTION

The present invention has been developed to solve the foregoing problems associated with the conventional guided-wave circuit modules and, thus, an object of the present invention is to provide a guided-wave circuit module and a wave-guiding optical component which makes it possible to package a large scale guided-wave circuit chip, in particular, whose warp cannot be neglected without application of any stress to the chip and which has a low fiber connection loss, a high return loss and a high mechanical strength.

According to a first aspect of the present invention, there is provided a guided-wave circuit module which comprises a guided-wave circuit chip including an input waveguide part and an output waveguide part which are linear optical waveguides and a guided-wave circuit part having a predetermined function and positioned between the input waveguide part and the output waveguide part; and a holder for supporting the guided-wave circuit chip, wherein the guided-wave circuit part does not come in contact with the holder and at least part of the linear guided-wave circuit part of the guided-wave circuit chip is fixed to the holder with a fixing agent.

Here, the fixing agent used for fixing the chip to the holder may have an elasticity.

An interstice formed between the central bottom surface of the guided-wave circuit chip and the holder may be filled with an ointment-like heat conductive material.

The holder for the chip may have a box-shaped form, the guided-wave circuit chip may be accommodated in and supported by the box-shaped chip holder;

the interstice formed between the guided-wave circuit chip and the box-shaped chip holder is filled with an ointment-like heat conductive material to indirectly adhere the guided-wave circuit chip and the box-shaped chip holder; and the adhesion of the chip to the holder may be performed by adhering at least part of the peripheral face of the guided-wave circuit chip to at least part of the upper surface of the opening of the box-shaped chip holder with an elastic fixing agent.

Moreover, the guided-wave circuit chip does not have a significant warp at least in the direction along the endfaces of the input and output waveguide parts, the chip holder covers upper and lower sides of the chip and the adhesive which adheres both ends of the chip holder to the input and output waveguide parts at both ends of the chip may have a Young's modulus of not less than 150 kg/mm$^2$.

The linear expansion coefficient of the holder may be approximately equal to that of the guided-wave circuit chip.

Further, the portion of the chip holder which does not come in contact with the guided-wave circuit may comprise an elastic material.

The guided-wave circuit chip may have a warp having a finite radius of curvature at least in the direction along the endfaces of the input and output waveguide parts and protective plates may be fitted to the chip surfaces right above and just below the waveguides of the input and output waveguide parts of the guided-wave circuit through a fixing agent.

According to a second aspect of the present invention, there is provided a guided-wave circuit module which comprises a guided-wave circuit chip including an input waveguide part and an output waveguide part, at the ends thereof, which are linear optical waveguides and a guided-wave circuit part having a predetermined function and positioned in the middle of the chip; and a holder for supporting the guided-wave circuit chip, wherein protective plates may be fitted to the chip surfaces right above and just below the waveguides of the input and output waveguide parts of the guided-wave circuit through a fixing agent, the surface of the chip holder is formed into a curved shape having a radius of curvature approximately equal to that of the guided-wave circuit chip, the bottom surface of the central part of the guided-wave circuit chip directly comes in contact with the chip holder surface and a part of the endface of the guided-wave circuit chip is fixed to the holder with a fixing agent.

Here, the fixing agent for fixing the chip to the holder may have an elasticity.

The Young's modulus of the fixing agent for adhering the protective plates to the chip may be not less than 150 kg/mm$^2$.

According to a further aspect of the present invention, there is provided a wave-guiding component which comprises a guided-wave circuit module including a guided-wave circuit chip supported by a chip holder and an optical fiber module having optical fibers whose ends are supported by a terminal holder, the guided-wave circuit module and the optical fiber module being connected to one another, wherein the guided-wave circuit chip is fixed to the chip holder with a fixing agent having a Young modulus of not less than 150 kg/mm$^2$ or the optical fibers are fixed to the terminal holder with the adhesive.

In the present invention, the fixing agent for fixing the holder may include, for instance, UV-curable adhesives, and a variety of adhesives such as heat-hardening adhesives and cold-setting adhesives and a solder.

The above and other objects, effects, features and advantages of the present invention will become more apparent from the following description of embodiments thereof taken in conjunction with the accompanying drawings.

DESCRIPTION OF PREFERRED EMBODIMENTS

Embodiment 1

Figure 5:
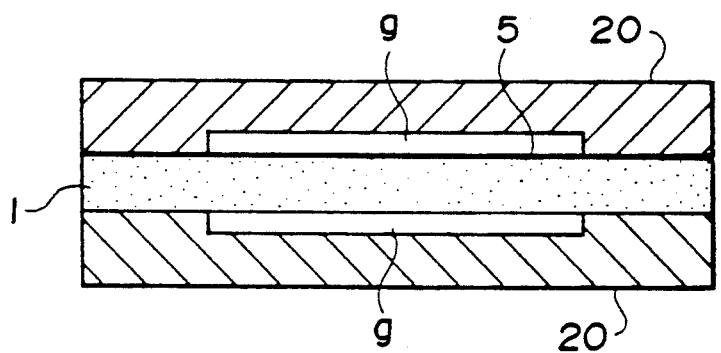
FIG. 5 is a cross sectional view of a first embodiment of the guided-wave circuit module according to the present invention.

FIG. 5 shows a first embodiment according to the present invention and is a cross sectional view of the guided-wave circuit module. Reference numeral 1 represents a guided-wave circuit chip which comprises a silicon substrate a silica-based single-mode guided-wave circuit 5 formed thereon and 20 represents a chip holder. Both ends of chip 1 are fixed to and supported by chip holder 20 and an interstice g is formed between chip 1 and holder 20 in the middle portion thereof.

Figure 6:
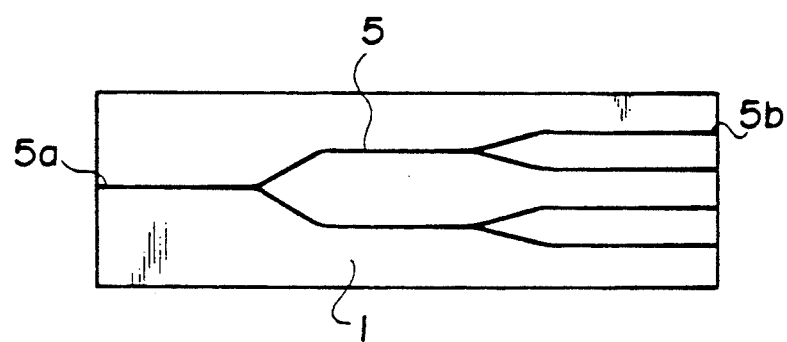
FIG. 6 is a plan view showing a guided-wave circuit chip constituting the first embodiment of the guided-wave circuit module according to the present invention.

As shown in FIG. 6, there are formed, on chip 1, an input waveguide part 5a and an output waveguide part 5b which are linear waveguides at both ends of the chip and curved waveguides 5 (guided-wave circuit part) serving as 1×4 splitters in the middle portion of the chip. As shown in FIG. 5, this guided-wave circuit chip 1 is adhered to holder 20 at portions on which input and output guided-wave circuit parts 5a and 5b are present and guided-wave circuit part 5 having branching function does not come in contact with holder 20.

Figure 7:
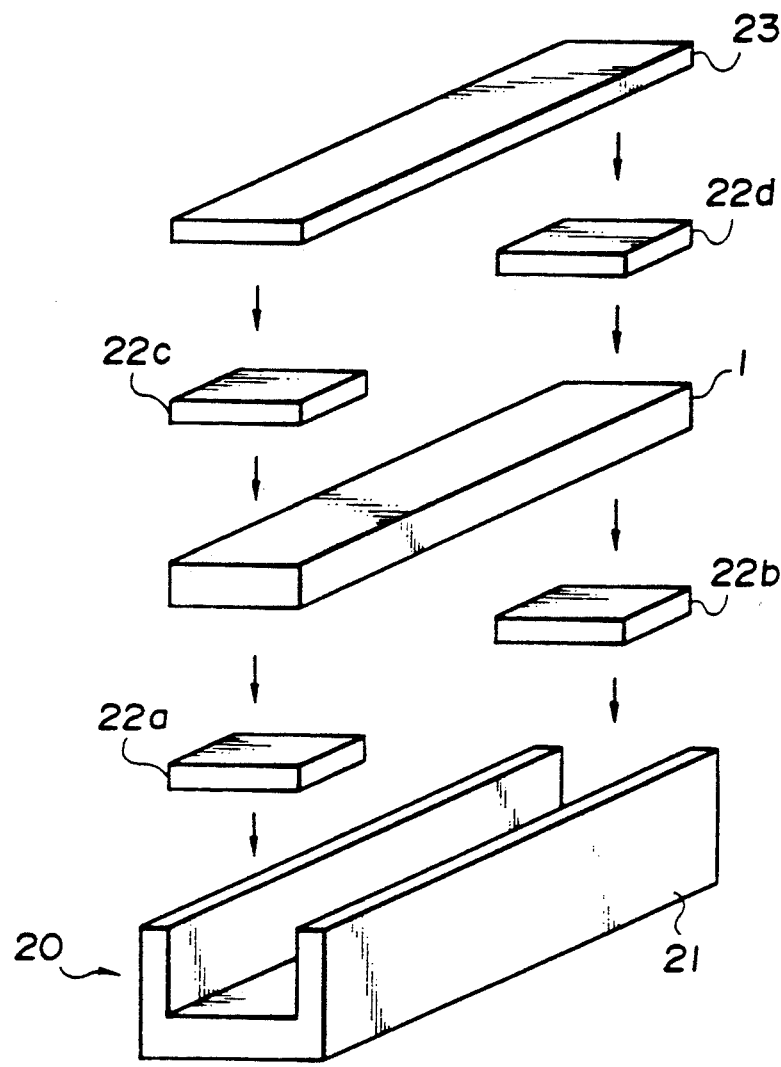
FIG. 7 is an exploded perspective view showing the first embodiment of the guided-wave circuit module according to the present invention.

As shown in FIG. 7, the foregoing holder 20 comprises six parts (three kinds), i.e., a lower frame 21, spacers 22a, 22b, 22c and 22d and presser plate 23. To fit chip 1 to such a holder 20, spacers 22a and 22b are adhered to both ends of lower frame 21 with an adhesive, then an adhesive is applied onto the surface of these spacers 22a and 22b and chip 1 is mounted on the spacers through the adhesive layer to adhere the chip to the holder. Further, an adhesive is applied onto both ends of chip 1 to adhere spacers 22c and 22d to chip 1 and finally presser plate 23 is mounted on the spacers to adhere the plate to spacers 22c and 22d and to thus complete a guided-wave circuit module.

Thereafter, 1×4 splitters whose guided-wave circuit chip has a insertion loss of 6.4±0.1 dB were formed into a module having the foregoing structure and the insertion loss of the resulting module was determined. As a result, it was found that the insertion losses observed at the 4 output ports of the guided-wave circuit module were also 6.4±0.1 dB. This clearly indicates that the characteristic of the guided-wave circuit chip are completely maintained even after forming into a module. Moreover, this module was subjected to a heat cycle test and the changes in the loss was found to be at most +0.1 dB over a temperature range of from −20° to 70° C.

In this embodiment, spacers 22a to 22d are used for separating guided-wave circuit part 5 of guided-wave circuit chip 1 from holder 20, but the spacers may be integrally formed during the processing of presser plate 23 and lower frame 21 without any trouble. In addition, a Y-shaped splitter has been explained as an example of curved guided-wave circuit part 5, but the present invention can likewise be applied to guided-wave circuit chips equipped with other curved guided-wave circuits such as directional couplers. Further, a silica-based guided-wave circuit is used in this embodiment, but the guided-wave circuit used herein may be other various guided-wave circuits such as multi-component glass guided-wave circuits and plastic guided-wave circuits.

Embodiment 2

Figure 8:
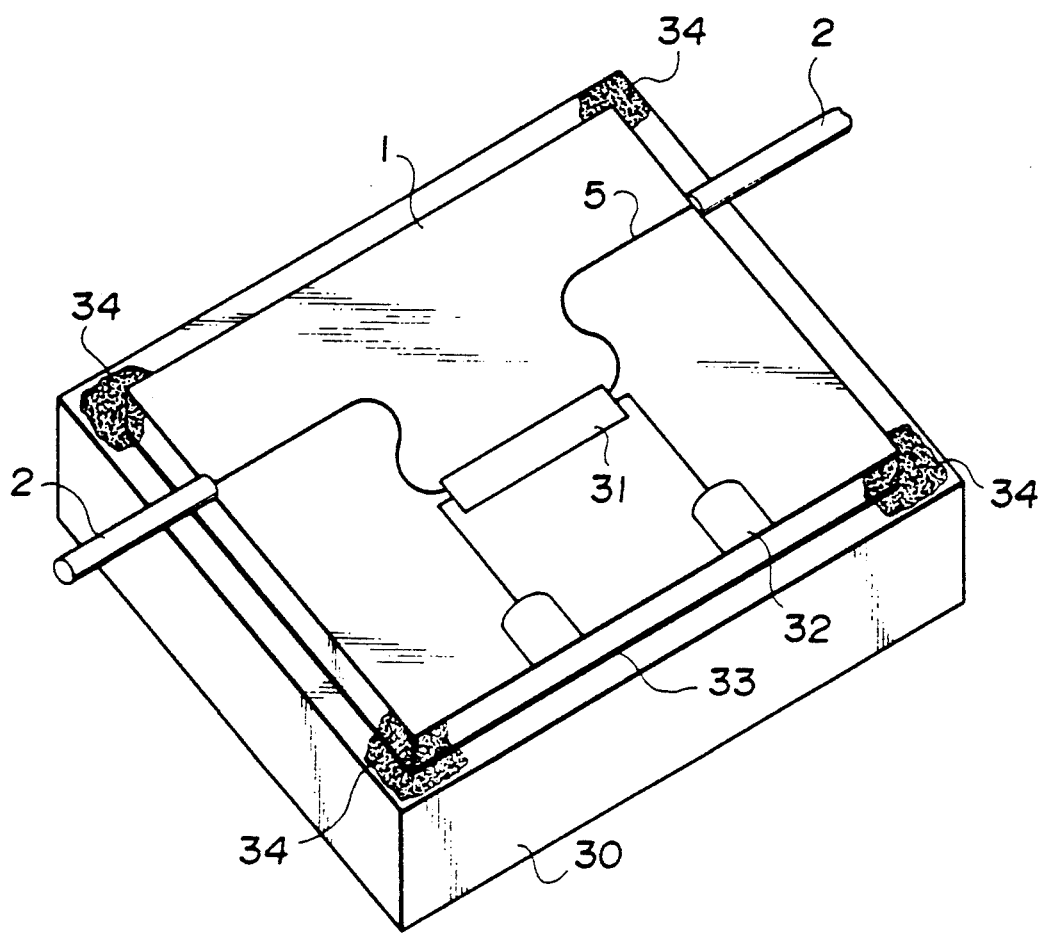
FIG. 8 is a perspective view showing a second embodiment of the guided-wave circuit module according to the present invention.

FIG. 8 shows a second embodiment according to the present invention and is a perspective view of the guided-wave circuit module. Reference numeral 1 represents a guided-wave circuit chip on which a guided-wave circuit 5 is formed, 2 represents optical fibers connected to guided-wave circuit 5 and 30 represents a box-shaped holder for supporting guided-wave circuit chip 1. Moreover, reference numeral 31 represents a heating element formed on guided-wave circuit 5, 32 represents an electrode pad for supplying an electric power to heating element 31, 33 represents an ointment-like heat-conductive resin and 34 represents an elastic adhesive for fixing chip 1 to holder 30.

In a specific example of the packaged structure shown in FIG. 8 wherein chip 1 is made of silicon and box-shaped chip holder 30 is made of copper, the linear expansion coefficient $a_1$ is 2.3 ppm and that $a_2$ of copper is 16.5 ppm. In this case, a stress S applied to the silicon chip can be given by the following relation if the length of guided-wave circuit chip 1 within the plane parallel to the chip surface is assumed to be L and the environmental temperature change is equal to $\Delta T$:

$$S = k \cdot L \cdot \Delta a \cdot \Delta T \qquad (I)$$

wherein k is a proportionality factor and $\Delta a = a_2 - a_1$.

According to the relation (I), the longer the length L, the greater the linear expansion coefficient difference $\Delta a$ and the greater the temperature change $\Delta T$, the greater the stress S. Further, the stress S likewise varies depending on the proportionality factor k. More specifically, the stress S generated can be minimized by reducing the factor k as small as possible (ideally zero).

The fixing of silicon chip 1 to holder 30 has conventionally been performed through the use of a heat-hardening heat-conductive adhesive. Therefore, the proportionality factor k is substantially high and accordingly characteristic properties of guided-wave circuit 5 is greatly influenced by the stress S. In this embodiment, however, silicon chip 1 is closely adhered to holder 30 with ointment-like heat-conductive resin 33, then the resulting assembly is subjected to heat-radiation treatment and desired circumfercial portions of silicon chip 1 are fixed to holder 30 through elastic adhesive 34. For this reason, the stress generated in the silicon chip and the holder due to a large difference in the linear expansion coefficient therebetween would be absorbed by elastic adhesive 34 and, therefore, there is not observed any deterioration in the characteristic properties of guided-wave circuit 5.

In the structure shown in FIG. 8, four corners of silicon chip 1 are fixed to holder 30, but the portion to be adhered to the holder may arbitrarily be selected depending on the packaged states of the guided-wave circuit chip and the position of the guided-wave circuit.

As has been explained above, in this embodiment of the packaged structure of the guided-wave circuit chip, chip 1 is closely adhered to holder 30 with ointment-like heat-conductive resin 33, then the resulting assembly is subjected to heat-radiation treatment and desired circumfercial portions of silicon chip 1 are fixed to holder 30 through elastic adhesive 34. Consequently, the stress generated in the silicon chip and the holder due to a large difference in the linear expansion coefficient therebetween would be absorbed by elastic adhesive 34 and, therefore, there is not observed any deterioration in the characteristic properties of guided-wave circuit 5.

Embodiment 3

FIGS. 9 to 12 are diagrams for explaining the structure of a third embodiment of the guided-wave circuit module according to the present invention. The construction of this embodiment will first be detailed.

Figure 9:
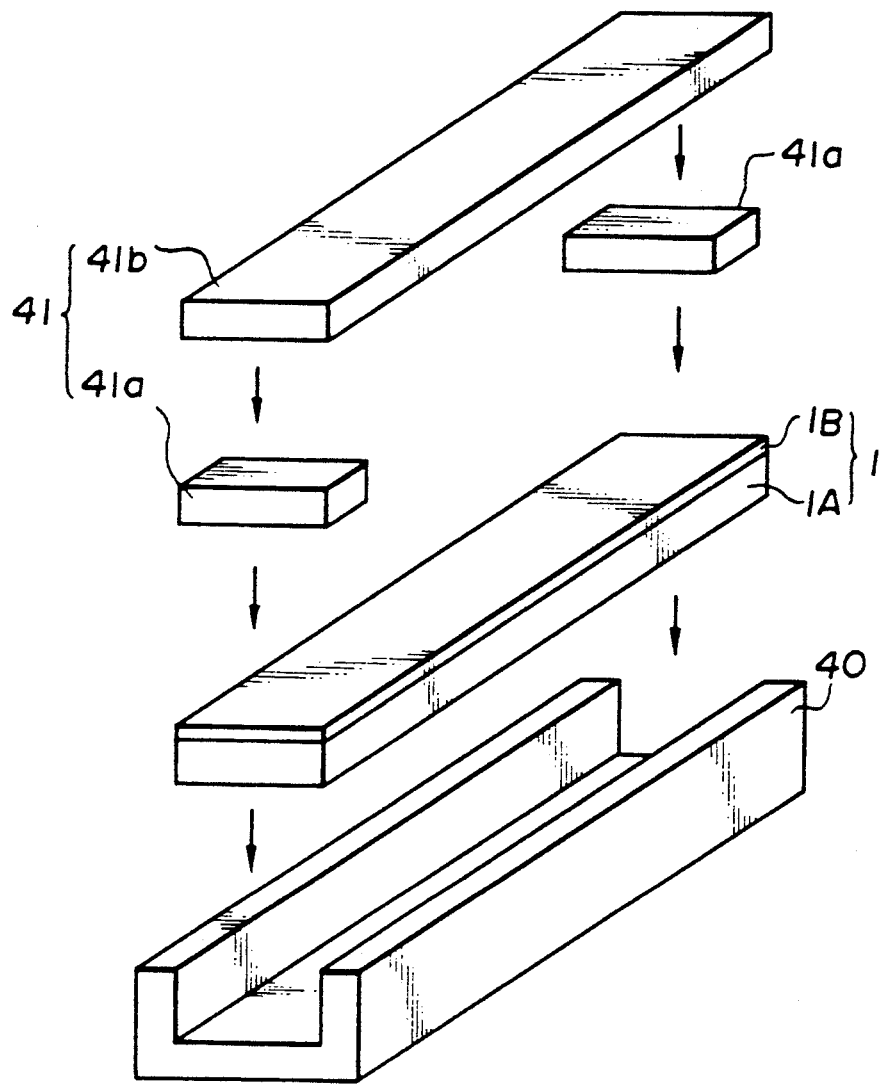
FIG. 9 is an exploded perspective view showing the third embodiment of the guided-wave circuit module according to the present invention.
Figure 10:
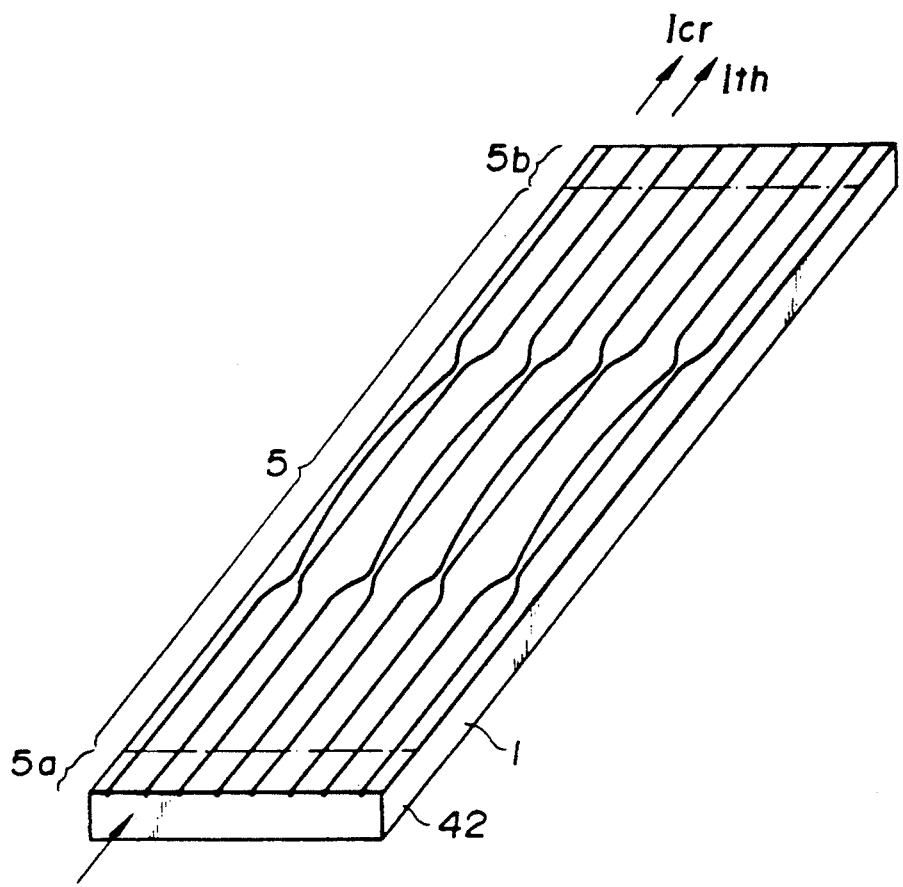
FIG. 10 is a perspective view showing a guided-wave circuit chip used in the third embodiment of the guided-wave circuit module according to the present invention.

FIG. 9 is an exploded perspective view for explaining the structure of the guided-wave circuit module. In this figure, reference numeral 1 is a guided-wave circuit chip and guided-wave circuit chip 1 comprises a substrate 1A on which a guided-wave circuit layer 1B having a guided-wave circuit is formed. Reference numeral 40 represents a trough-like lower holder having a side wall for supporting guided-wave circuit chip 1 and 41 represents an upper holder. Upper holder comprises a spacer 41a and an upper plate 41b.

In this embodiment, guided-wave circuit chip 1 comprises a silicon substrate 1A on which silica-based glass guided-wave circuit layer 1B is formed. The dimension of the substrate is 4 mm×20 min. shown in FIG. 10, a guided-wave circuit part 5 formed on guided-wave circuit layer 1B is composed of 4 Mach-Zehnder interferometers 42, arranged in a parallel relation, in which two directional coupler parts are connected through two guided-wave circuits having different lengths. An input waveguide part 5a and an output waveguide part 5b which linear waveguides are arranged on both sides of this guided-wave circuit 5 (interferometer part). This interferometer 42 is a coupler for branching a signal light introduced through a single input waveguide and outputting these branched light signals to two output waveguide of output part 5b. This is designed such that the optical path difference between two optical paths is controlled to an accuracy of the order of the wavelength of the light signal and has a branching characteristic free of wavelength-dependency over a wavelength range of from 1.3 to 1.6 μm, i.e., a ratio of the light intensity Icr of the cross port to the light intensity Ith of the through port (Icr/Ith) of 20%.

As has been described above, in the guided-wave circuit of chip 1 according to this embodiment, optical path control on the order of the wavelength is performed. Accordingly, large changes of characteristic properties are caused when an external stress is applied to guided-wave circuit chip 1 upon packaging the chip. In other words, the refractive index of the guided-wave circuit is changed due to the photo-elastic effect when stress is applied to the guided-wave circuit and as a result, the optical path difference in interferometer 42 is changed leading to a change of the branching characteristic. When packaging a substrate having a guided-wave circuit which performs such an accurate optical path length control, the module must have a structure which does not apply any stress to the substrate.

Figure 11:
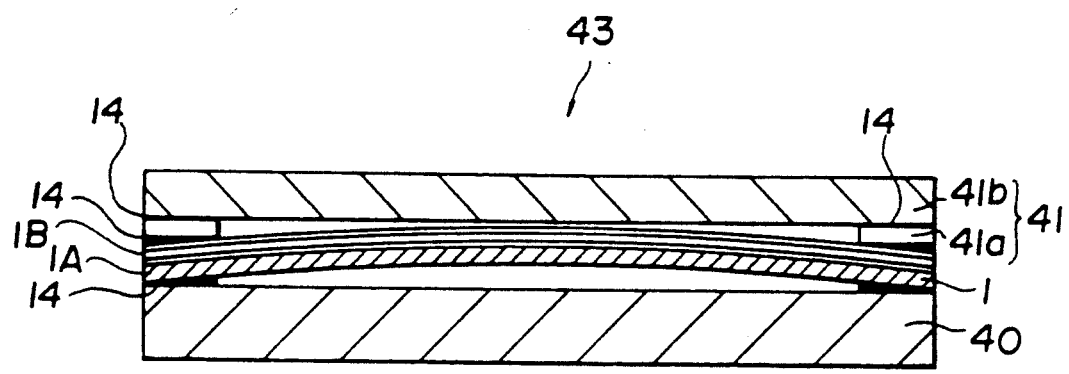
FIG. 11 is a sectional side elevation of the guided-wave circuit module according to the third embodiment of the present invention.
Figure 12:
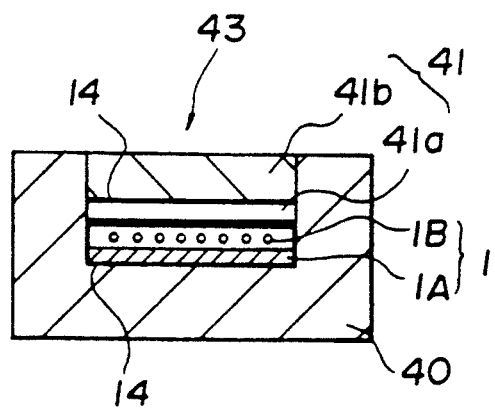
FIG. 12 is an end view of the guided-wave circuit module according to the third embodiment of the present invention.

For this reason, this embodiment is designed to have the structure shown in FIGS. 9, 11 and 12. FIG. 11 is a sectional side elevation of a guided-wave circuit module comprising chip 1 shown in FIG. 9 and holders 40 and 41, which is taken along the longitudinal direction of the module. Guided-wave circuit chip 1 has a warp generated due to the difference in the linear expansion coefficient between silicon used as a material for substrate 1A and silica-glass as a material for circuit layer 1B. The radius of curvature of the warp ranges from about 10 to 50 m. Incidentally, since the dimension along the latitudinal direction of chip 1 (, or width,) is as small as 4 mm, chip 1 does not have any significant warp, in the direction along the light input and output endfaces (latitudinal direction of the chip) which generates any strain affecting the optical properties of the module even if the entire edge thereof is fixed to the holder. In FIG. 11, only the portions around input and output guide-wave circuit parts 5a and 5b of guided-wave circuit chip 1 are fixed to holder 40 with an adhesive 14 so that the radius of curvature of this warp does not vary. In addition, spacer 41a is fitted to upper holder 41 only at the portions near input and output guided-wave circuit parts 5a and 5b of guided-wave circuit chip 1 and upper plate 41b is fixed through the spacers. Spacer 41a, holder 41, upper plate 41b and chip 1 are all adhered with an adhesive 14. Incidentally, holders 40 and 41 of this embodiment are formed from a borosilicate glass material. This material has a linear expansion coefficient approximately identical to that of silicon substrate and is transparent to light rays up to the ultraviolet region. A UV-curable adhesive is used as adhesive 14 since holders 40 and 41 are formed from a material capable of transmitting UV light rays. Further, a hard adhesive having a Young's modulus of 150 kg/mm$^2$ is herein used as adhesive 14 taking into consideration the polishing of the endface of the guided-wave circuit.

FIG. 12 is a diagram showing the endface of guided-wave circuit module 43. A UV-curable adhesive 14 as a fixing agent is applied onto the circumference of guided-wave circuit chip 1. Both endfaces of guided-wave circuit module 43 are accurately polished prior to the optical fiber connection.

Then, the effect achieved by the guided-wave circuit module according to the third embodiment will be explained below.

Figure 13:
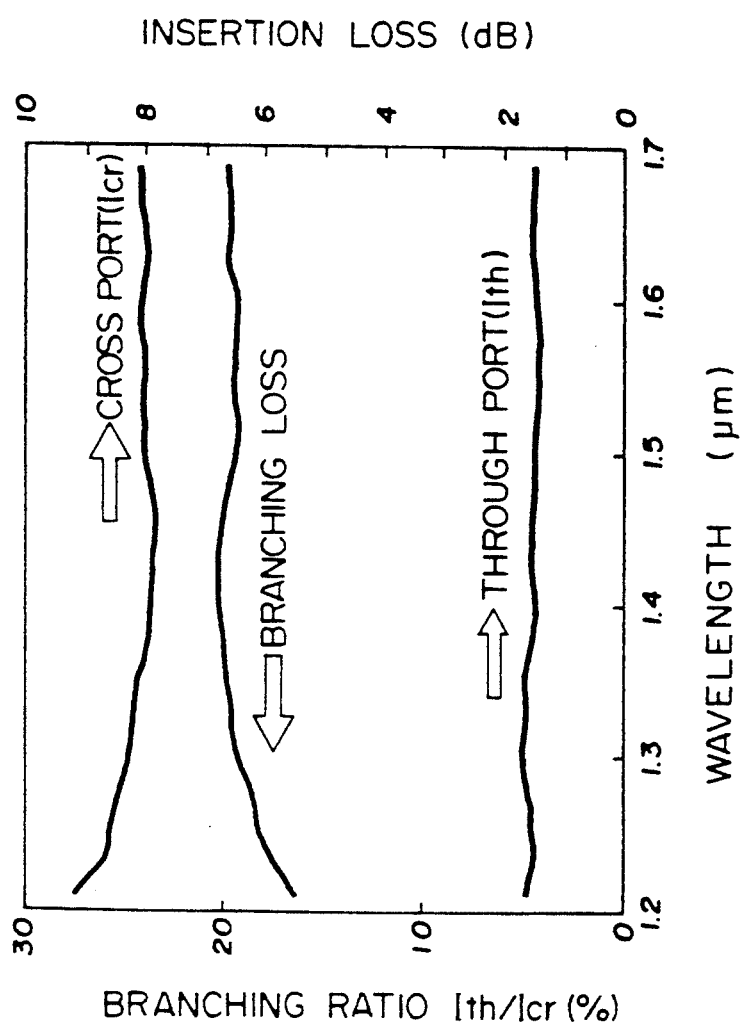
FIG. 13 is a graph illustrating the waveguide characteristic of the guided-wave circuit module according to the third embodiment of the present invention.

First of all, the module makes it possible to package the chip without applying any stress to the chip. In the embodiment 3, as has been discussed above, only the portions near input and output guided-wave circuit parts 5a and 5b of guided-wave circuit chip 1 are fixed to holders 40 and 41 with fixing agent 14, while interferometer part 5, sensitive to stresses, does not come in contact with frames 40 and 41 and fixing agent 14. Such a structure makes it possible to fix the chip to the holder without changing the radius of curvature of the warp of the chip irrespective of the presence of any warp in the guided-wave circuit chip. FIG. 13 shows characteristic properties of the guided-wave circuit after packaging according to the present invention. The foregoing structure makes it possible to prevent application of any stress to the guided-wave circuit chip during packaging and accordingly, the resulting packaged guided-wave circuit shows wavelength-independency such that it has a branching ratio on the order of 20% within the wavelength region ranging from 1.3 to 1.6 $\mu$m without impairing the initial properties of the prepackaged guided-wave circuit.

Figure 14:
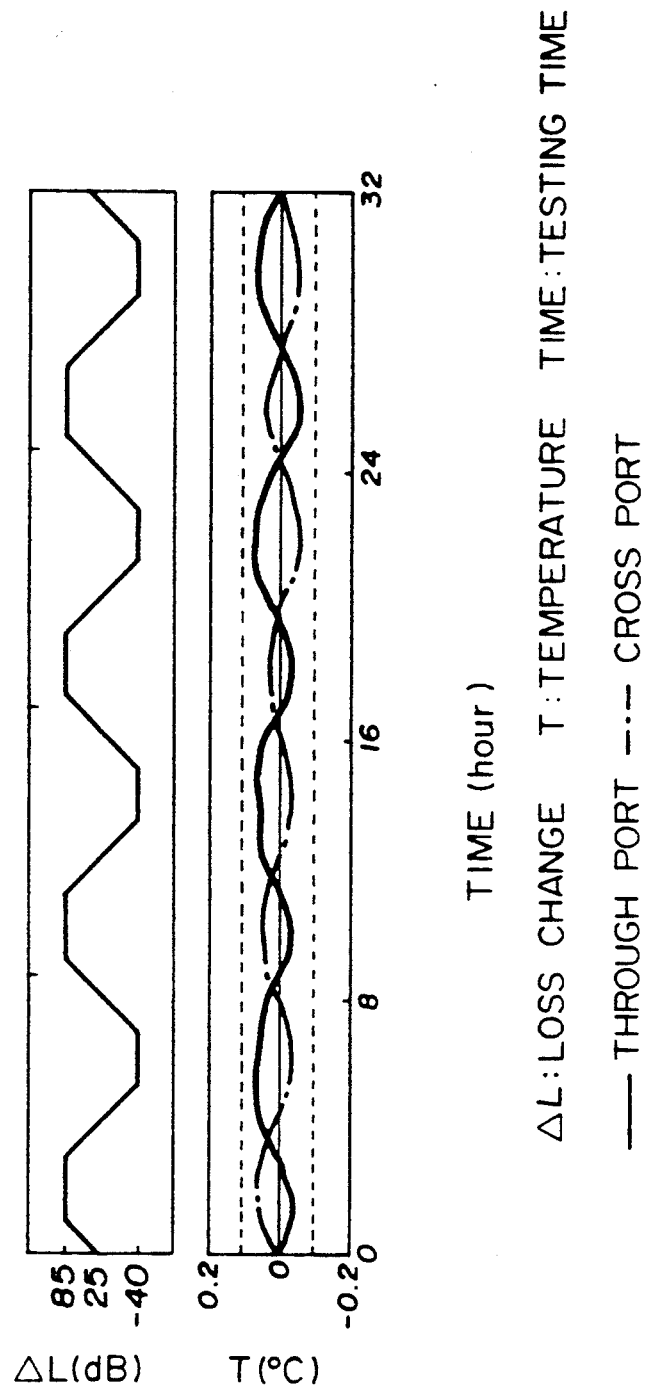
FIG. 14 is a graph illustrating the heat cycle characteristic of the guided-wave circuit module according to the third embodiment of the present invention.

Moreover, in this embodiment, a borosilicate glass material having a linear expansion coefficient approximately equal to that of the silicon substrate is used as a material for the holder for supporting guided-wave circuit chip 1 and, therefore, any change in characteristic properties of the guided-wave circuit due to the environmental temperature change can be eliminated. FIG. 14 shows results of a heat cycle test performed for confirming the effect of this embodiment. Measurements were carried out at a wavelength of 1.3 $\mu$m. Thus, it was confirmed that the guided-wave circuit has good temperature-stability, since the fiber connection loss of the circuit varied within ±0.1 dB as the temperature was changed from −40° C. to 85° C.

Figure 1:
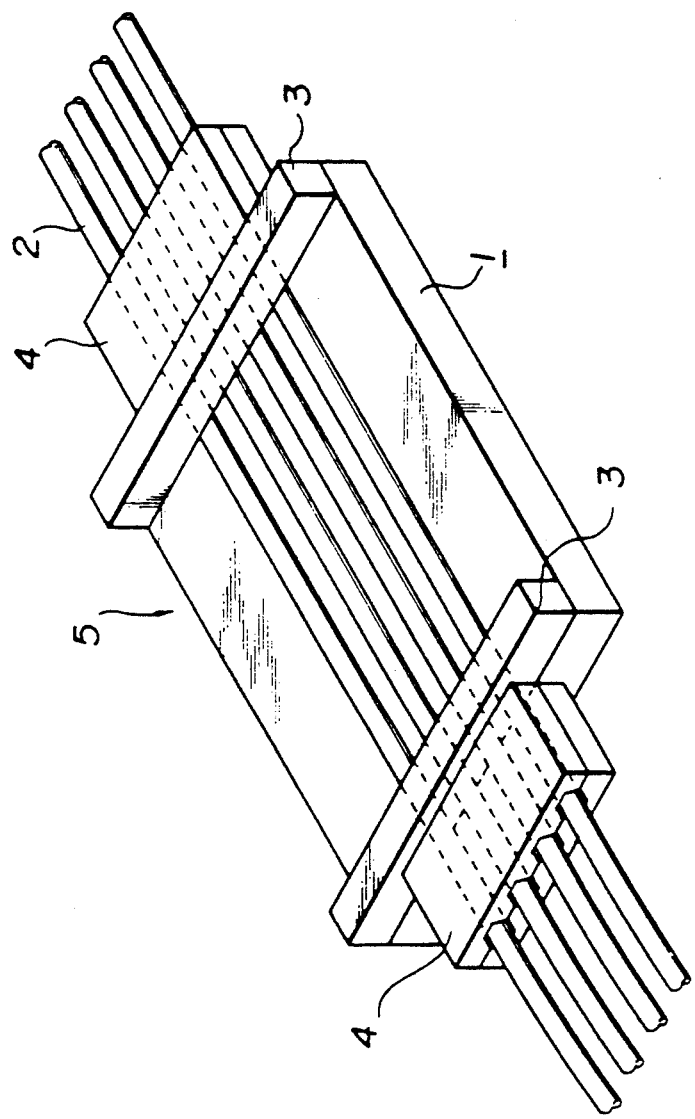
FIG. 1 is a perspective view showing a first embodiment of the conventional guided-wave circuit module.
Figure 2:
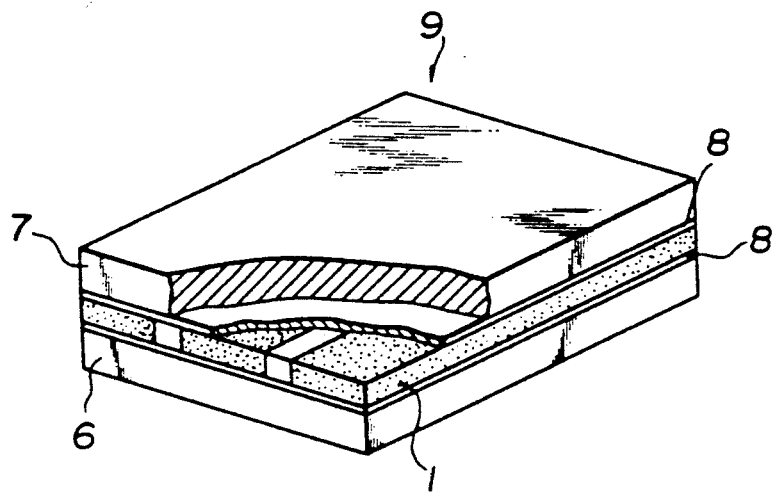
FIG. 2 shows a second embodiment of the conventional guided-wave circuit module and is a perspective view of a guided-wave circuit chip as a component of the module.
Figure 3:
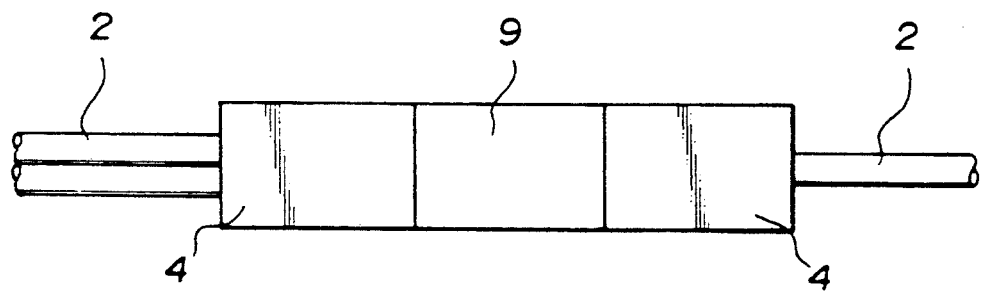
FIG. 3 shows a second embodiment of the conventional guided-wave circuit module and is a side view thereof.
Figure 4:
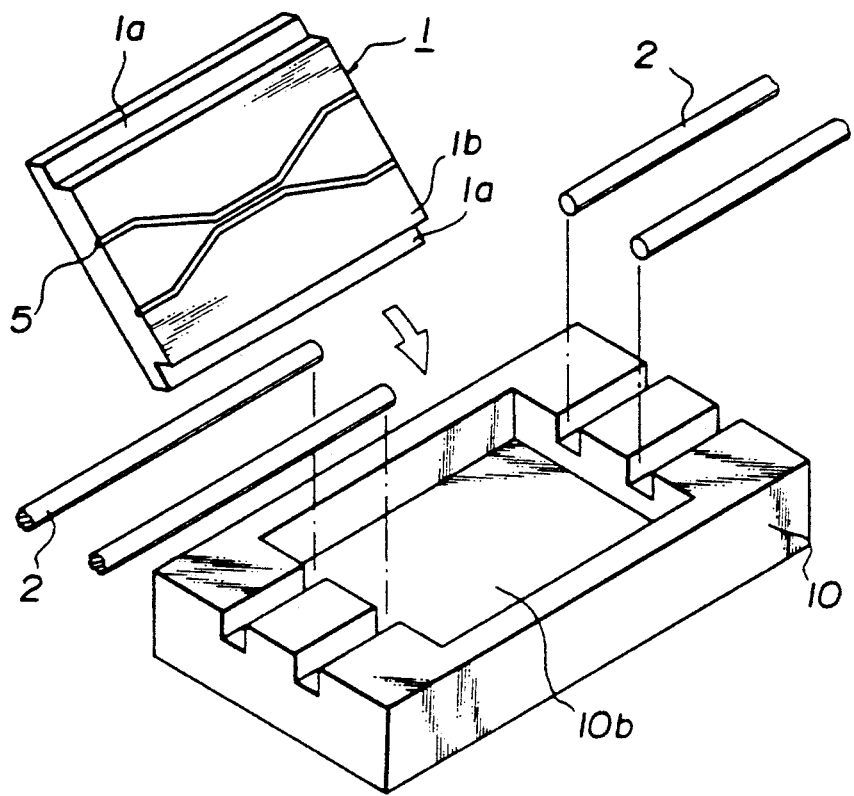
FIG. 4 shows a third embodiment of the conventional guided-wave circuit module and is an exploded perspective view of the module.
Figure 15:
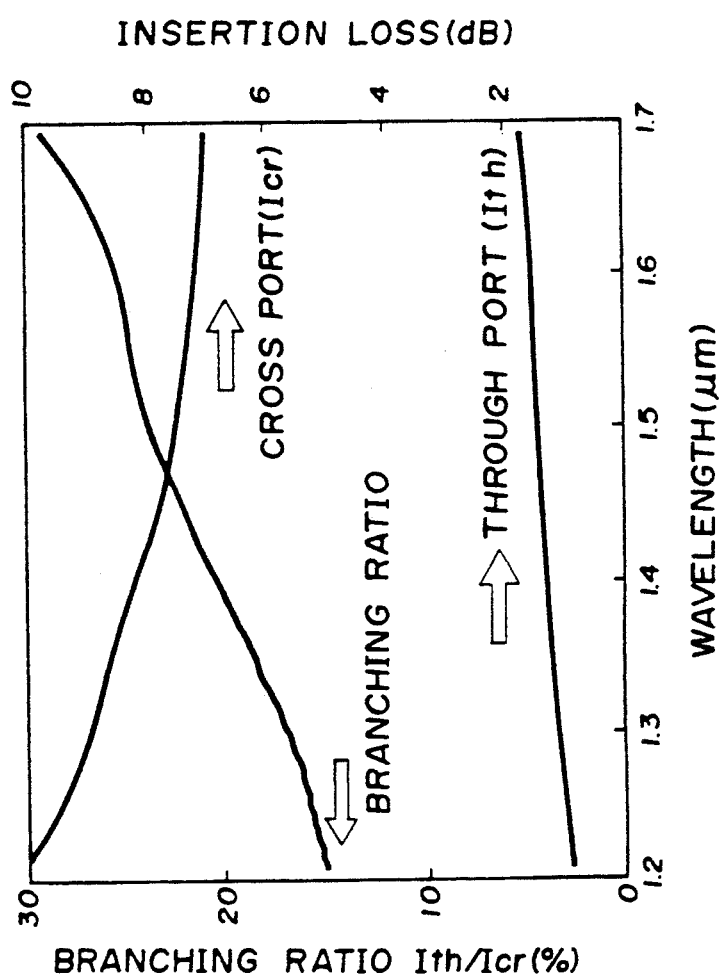
FIG. 15 is a graph illustrating the heat cycle characteristic of the guided-wave circuit of a comparative guided-wave circuit module corresponding to the third embodiment according to the present invention.

To further confirm the effect achieved by the third embodiment, guided-wave circuit chip 1 of the borosilicate glass was then packaged according to the conventional method as shown in FIGS. 2 and 3, or by sandwiching the entire chip with a surface coated with a fixing agent, between two sheets of planar mounting substrates as a comparative example. Characteristic properties of the resulting guided-wave circuit after packaging are plotted on FIG. 15. As seen from this figure, the initial wavelength-independency was impaired and the branching ratio varied depending on the wavelength used. This packaged chip was subjected to the same heat cycle test used above and the variation in the fiber connection loss was found to be ±0.5 dB. This indicates that the chip has highly temperature-dependent characteristic properties.

Secondary, this third embodiment makes it possible to accurately polish the endface of the guided-wave circuit. The periphery of guided-wave circuit chip 1 of this embodiment is, as shown in FIG. 12, completely covered with a layer of a hard adhesive 14 having a Young's modules of 150 kg/mm$^2$. This prevents breakage and formation of defects at the endfaces of the circuit during polishing. A total of 25 modules, corresponding to 400 connections between optical fibers and waveguides, were produced according to this embodiment. The resulting modules had low fiber connection losses and high return losses. In fact, these modules showed an averaged fiber connection loss of 0.09 dB/connection, the best value of connection loss on the order of 0.03 dB and the worst value of 0.25 dB. Moreover, the modules showed an averaged return loss of 46 dB, the best value of return loss on the order of 48 dB and the worst value of 45 dB.

Figure 16:
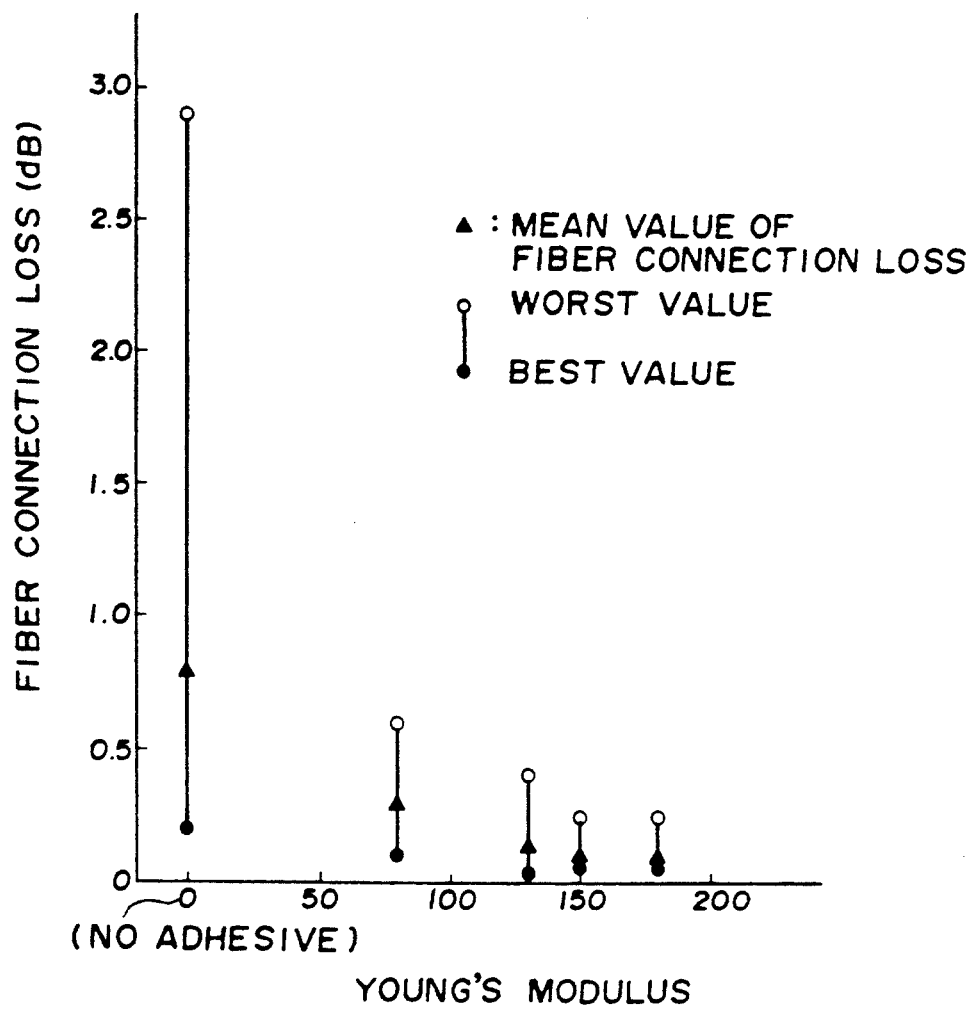
FIG. 16 is a graph illustrating the relation between the Young's modulus and the fiber connection loss of the adhesive used in a comparative guided-wave circuit module corresponding to the third embodiment according to the present invention.

To confirm the effect achieved by the third embodiment, guided-wave circuit modules were produced using a variety of adhesives having different Young's moduli and the scattering in the fiber connection losses of these modules were determined. The result s thus obtained are plotted on FIG. 16. Three modules were produced for each adhesive (corresponding to 48 connections). In this figure, a filled triangle represents an averaged fiber connection loss, a filled circle means the best value of fiber connection loss and an open circle means the worst value of fiber connection loss. When no adhesive was used, the endfaces of the waveguides were often damaged. The worst value of the fiber connect ion loss reached approximately 3 dB. When an adhesive was used, the average value and scattering of the fiber connection loss were substantially reduced. For instance, when an adhesive having a Young's modulus of 80 kg/mm$^2$ was used, the averaged value and the worst value of fiber connection loss were 0.3 dB and 0.6 dB, respectively. The fiber connection loss decreased as the Young's modulus of the adhesive used increased. For example, when an adhesive having a Young's modulus of 130 kg/mm$^2$ was used, the worst value of the fiber connection loss was 0.4 dB, but the best value thereof was 0.1 dB or lower. On the other hand, when the Young's modulus of the adhesive used was 150 kg/mm$^2$ or higher, the worst value was one the order of 0.25 dB. Any significant change in the fiber connection loss was not obtained even when the Young's modulus of the adhesive used was greater than 150 kg/mm$^2$. The return loss showed a tendency similar to that of the fiber connection loss. For example, when the Young's modulus of the adhesive used was 80 kg/mm$^2$ the best value and the worst value thereof were 47 dB and 35 dB respectively, but the worst value was improved as the Young's modulus increased. For instance, when the Young's modulus of the adhesive was 150 kg/mm$^2$ or higher, any Young's modulus-dependency on the fiber connection loss was not observed.

As has been discussed above in detail, the endfaces of the guided-wave circuit chip is covered with an adhesive having a high hardness in this third embodiment and thus any formation of defects on the endfaces of the guided-wave circuit chip can substantially eliminated. In particular, if a hard adhesive having a Young's modulus of 150 kg/mm$^2$ is used, accurately polished faces can be obtained and accordingly the resulting guided-wave circuit module has good fiber connection characteristics.

Embodiments 4 and 5

Figure 17:
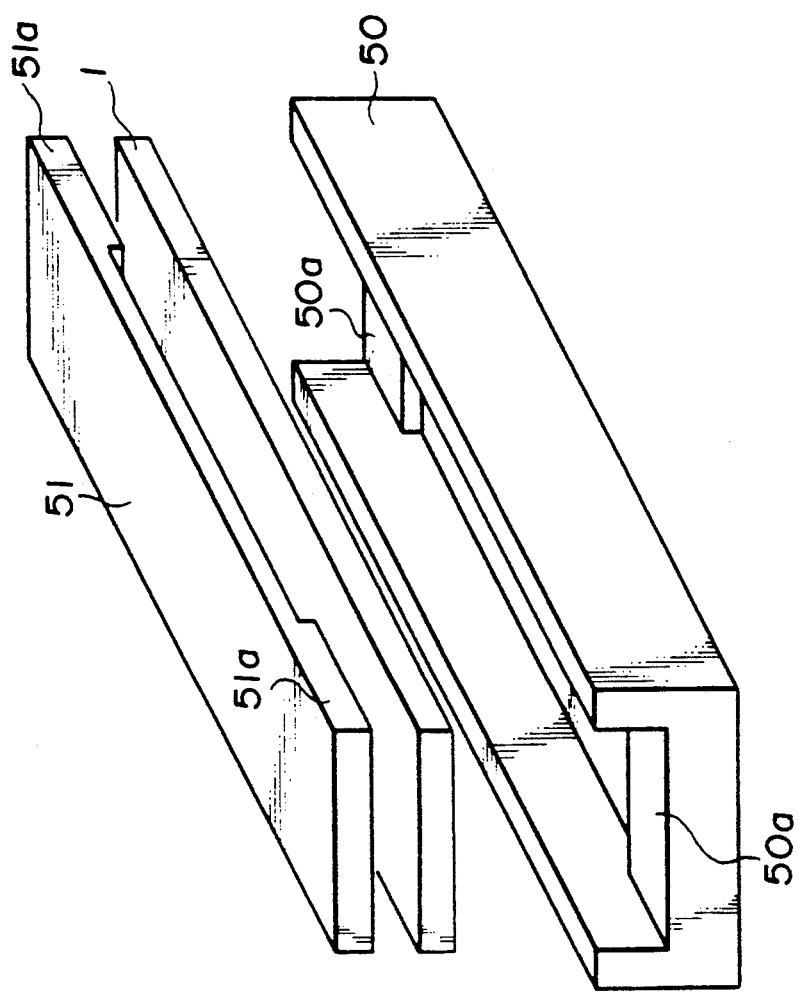
FIG. 17 is an exploded perspective view showing a fourth embodiment of the guided-wave circuit module according to the present invention.
Figure 18:
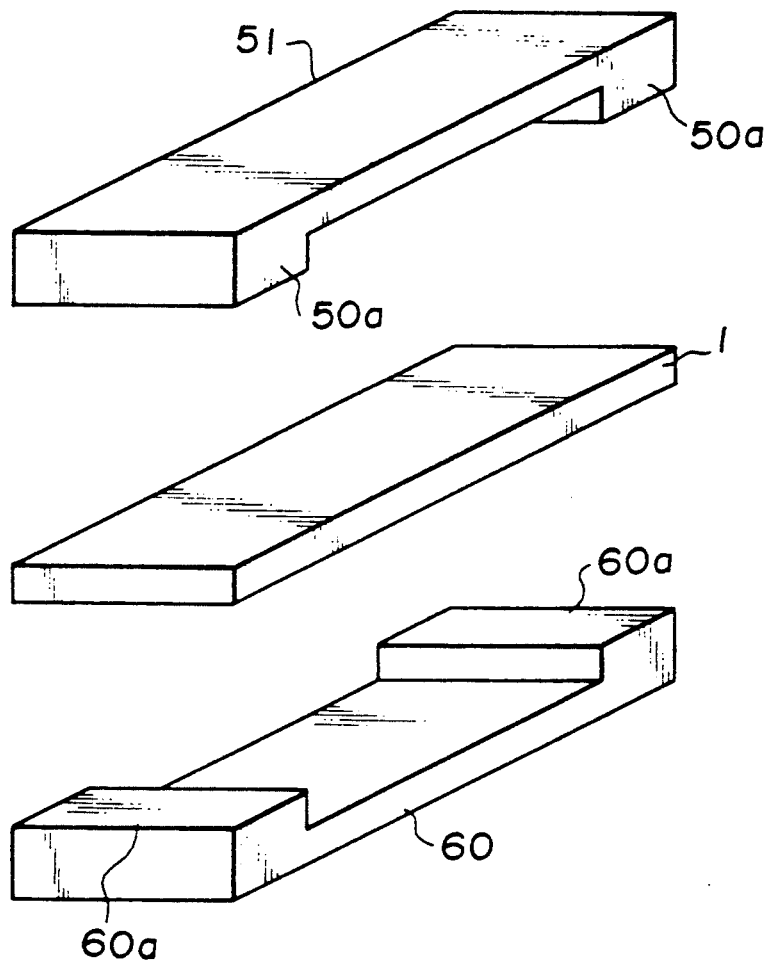
FIG. 18 is an exploded perspective view showing a fifth embodiment of the guided-wave circuit module according to the present invention.

FIGS. 17 and 18 are, respectively, exploded views for explaining the guided-wave circuit module structures according to fourth and fifth embodiments of the present invention. These fourth and fifth embodiments are different in the structures of upper and lower holders from the foregoing third embodiment.

More specifically, in the fourth embodiment shown in FIG. 17, projected spacer parts 50a are formed at both upper ends of a lower trough-like holder 50 and spacer parts 51a are integrally formed in the upper holder 51.

On the other hand, in the module of the fifth embodiment shown in FIG. 18, holders have basically the same structures used in the fourth embodiment except that lower holder 60 has a structure identical to that of lower holder 50 except that the side walls are removed. All of other components of these modules according to the fourth and fifth embodiments are the same those used in the third embodiment.

Figure 19:
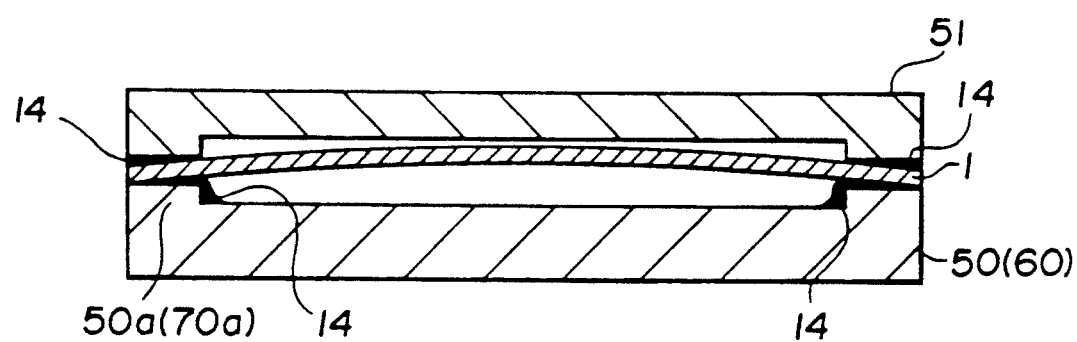
FIG. 19 is a sectional side elevation of the guided-wave circuit module according to the fourth or fifth embodiment of the present invention.

In these fourth and fifth embodiments, each holder and the corresponding spacers are united for the purpose of improving the production yield of the guided-wave circuit module according to the present invention. In other words, the bottom surface of lower holder 40 is flat in the third embodiment. Therefore, if the amount of the adhesive added dropwise to the endfaces of the guided-wave circuit is too great, the adhesive flows into the interferometer part and, correspondingly, a stress is sometimes applied to these portions. Thus, it is necessary to accurately control the amount of the adhesive to be added dropwise in order to solve this problem. On the other hand, in the fourth and fifth embodiments, the bottom surface of lower holder 50 (60) has a concave shape due to the presence of spacers 50a (60a) as shown in FIG. 19 and the excess adhesive 14 flows into the concave portion of frame 50 (60) to thus protect interferometer part 5 of chip 5 which is very sensitive to stress.

In the fifth embodiment (see FIG. 18), lower holder 60 is designed to have a structure free of side walls for the purpose of reducing the production cost of lower holder 60. The foregoing characteristic properties described above in connection with the fourth embodiment (FIG. 17) are also proved true in holder 60 of the fifth embodiment.

Other characteristic properties of these modules are completely the same as those of third embodiment.

Embodiment 6

Figure 20:
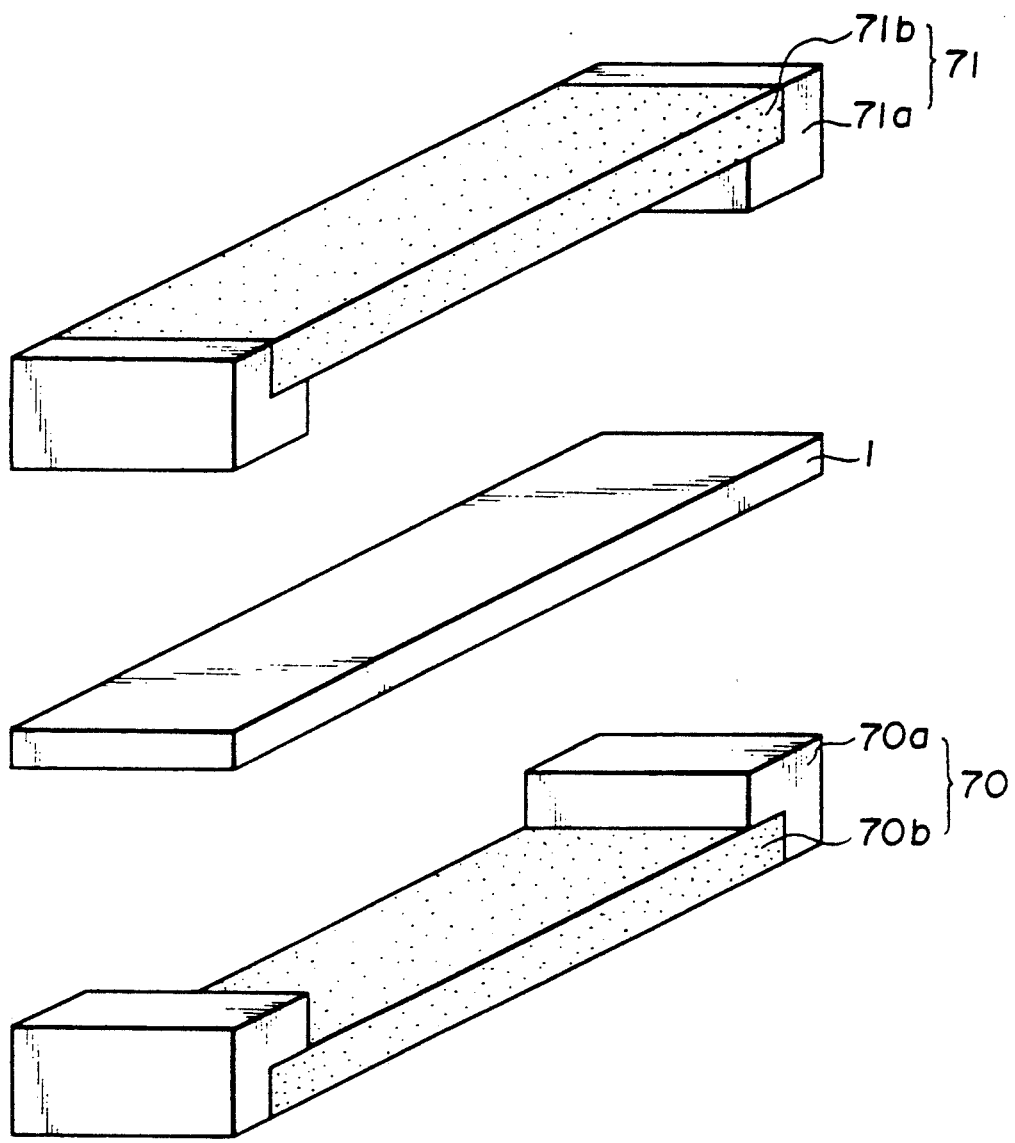
FIG. 20 is an exploded perspective view showing a sixth embodiment of the guided-wave circuit module according to the present invention.

FIG. 20 shows the sixth embodiment according to the present invention. The module according to this embodiment differs from those of the embodiments 3 to 5 in that at least port ions 70b and 71b of lower holder 70 and upper holder 71 which do not come in contact with guided-wave circuit chip 1 are formed from an elastic material. In the module shown in FIG. 20, spacer parts 70a and 71a of holders 70 and 71 are composed of a glass material and non-contact portions 70b and 71b are composed of a rubber-like resin. Other components are the same as those used in the embodiments 3 to 5.

Such a structure can provide a thermally stable guided-wave circuit module. More specifically, since the central portion of the holder is composed of an elastic material in this embodiment, any stress generated due to the mismatching in the linear expansion coefficient between holders 70 and 71 and chip 1 when there is a great change in the environmental temperature of the guided-wave circuit module is not applied to guided-wave circuit chip 1. Moreover, the endfaces thereof which require polishing are composed of a glass material having a sufficient hardness and, therefore, the endfaces can accurately be polished like the embodiments 3 to 5. Characteristic properties of the guided-wave circuit module according to the sixth embodiment are the same as those of the embodiments 3 to 5.

Such a structure of the guided-wave circuit module is effective if any holder material having a linear expansion coefficient consistent with that of the guided-wave circuit chip is not present.

Embodiment 7

FIGS. 21 to 24 are diagrams for explaining the guided-wave circuit module structure according to a seventh embodiment of the present invention. First the structure of this embodiment will be detailed below.

Figure 21:
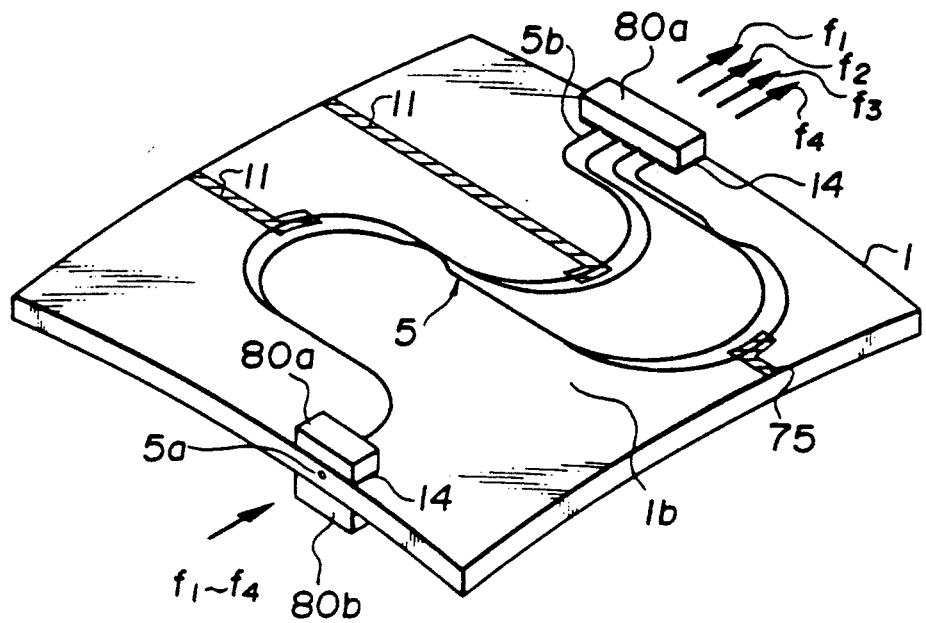
FIG. 21 is a perspective view showing a guided-wave circuit chip constituting a seventh embodiment of the guided-wave circuit module according to the present invention.

FIG. 21 is a diagram for explaining the guided-wave circuit chip. A guided-wave circuit 5 (guided-wave circuit part) is formed at the central portion 1b of chip 1 and is provided with a phase control heater 75. In addition, an input waveguide part 5a and an output waveguide part 5b are, respectively, equipped with an upper protective plate 80a and a lower protective plated 80b.

Guided-wave circuit chip 1 used herein comprises a silicon substrate provided thereon with a silica-based guided-wave circuit layer and has a size of 5 cm × 5 cm. This chip has warps in both longitudinal and lateral directions due to mismatching in the linear expansion coefficient between silicon and silica-glass and the radius of curvature thereof ranges from about 10 to 50 m. Three Mach-Zehnder interferometers, each comprising two directional couplers (3 dB couplers) connected through two guided-wave circuit having different lengths, are integrated at central portion 1b of chip 1. Input and output waveguide parts 5a and 5b which are linear waveguides are disposed at the ends of chip 1.

This guided-wave circuit 5 of chip 1 separates four optical frequency multiplexing signals (frequencies $f_1$ to $f_4$) introduced into the circuit through a single input waveguide into four signals each having the corresponding frequency and outputs these separated signals to four output waveguides. Any specific frequency and be filtered out from these four frequencies through each output waveguide by properly setting the electric current to be applied to phase control heater 75.

Protective plates 80a and 80b are adhered by an adhesive 14 to the upper and lower surfaces of the chip at positions where input and output waveguide parts 5a and 5b are present. In this embodiment, protective plates 80a and 80b are formed from a borosilicate glass having a linear expansion coefficient approximately identical to that of silicon and a UV-curable adhesive having a Young's modulus of 150 kg/mm$^2$ is used as adhesive 14.

It is necessary to control the optical path difference between the two guided-wave circuits of each Mach-Zehnder interferometer to an accuracy on the order of the wavelength used with guided-wave circuit 5. Moreover, guided-wave circuit 5 has a large characteristic change upon application of any external stress to guided-wave circuit chip 1. In other words, when stress is applied to guided-wave circuit 5, the refractive index of guided-wave circuit 5 varies due to the photo-elastic effect and the coupling ratio and optical path difference at the directional coupler part in the interferometer varies accordingly. This leads to substantial deterioration of the frequency-selectivity of the signal light output 10 from output waveguide part 5b. Therefore, it is an essential requirement for the module to have a structure which prevents application of any stress to chip 1 when guided-wave circuit 5, which requires such an accurate control of the optical path length, is packaged. It is important to package the chip without changing the radius of curvature of warps, in particular in the case of a guided-wave circuit chip whose warp cannot be neglected.

Figure 22:
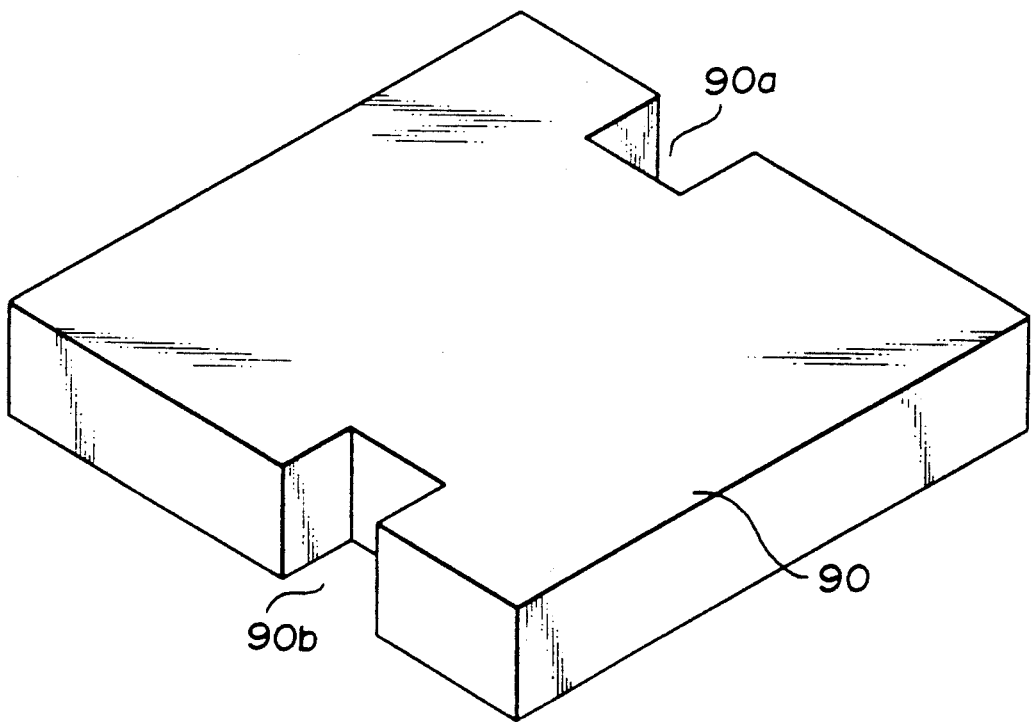
FIG. 22 is a perspective view showing a holder constituting the seventh embodiment of the guided-wave circuit module according to the present invention.

Accordingly, this embodiment is designed to have the module structure shown in FIG. 22 while using holder 90 as shown in FIG. 22. FIG. 22 shows holder 90 for supporting guided-wave circuit chip 1 having a flat surface. Moreover, cut portions 90a are formed at parts of both ends of holder 90 for the sake of fiber connection.

Figure 23:
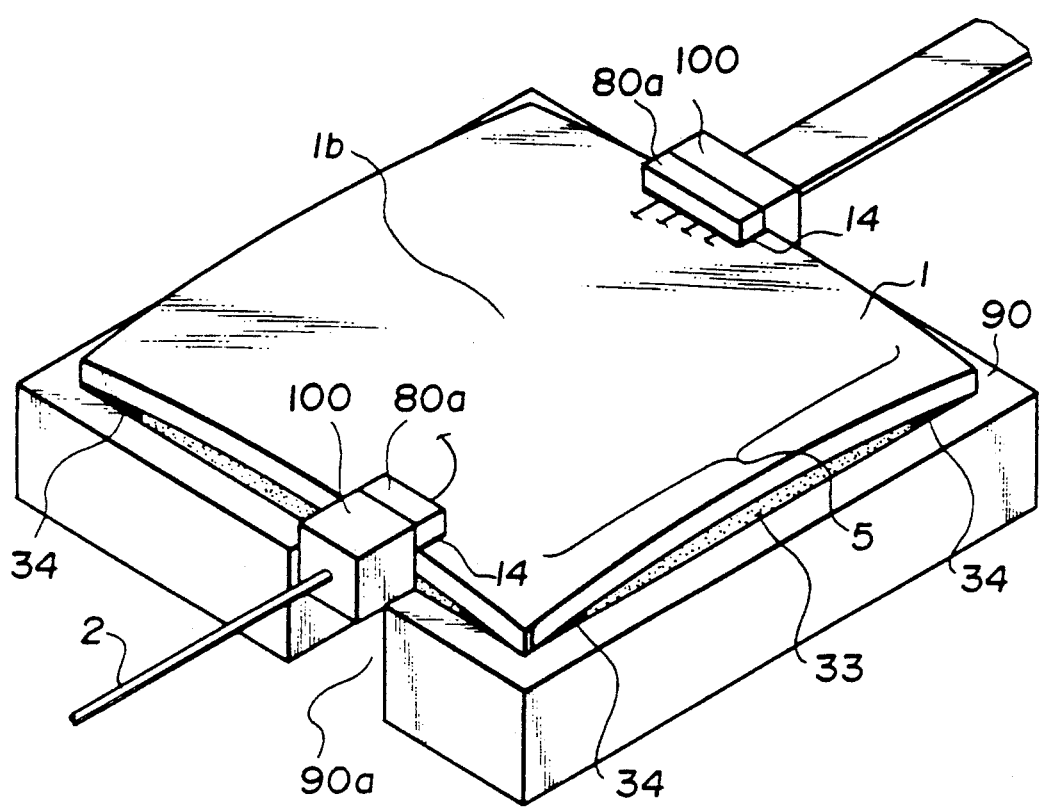
FIG. 23 is a perspective view showing a guided-wave circuit module according to the seventh embodiment of the present invention.
Figure 24:
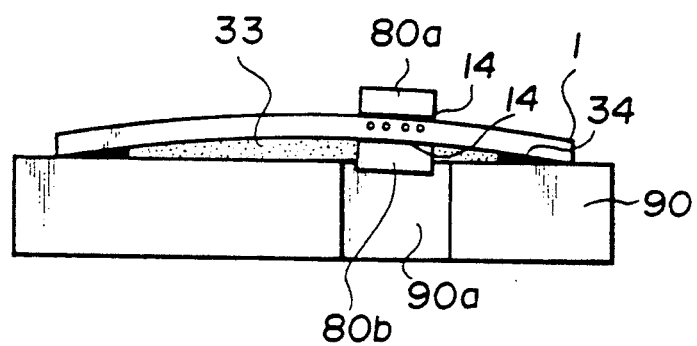
FIG. 24 is a side view of the guided-wave circuit module according to the seventh embodiment, in which a part thereof is omitted.

FIG. 23 shows a guided-wave circuit module which comprises guided-wave circuit chip 1 supported by holder 90 and optical fibers connected to chip 1. In this module, guided-wave circuit chip 1 is fixed to the holder in the vicinity of the ends of the guided-wave circuit with an adhesive 34. Since chip 1 has a warp at the central guided-wave circuit part 5 (the circuit pattern thereof is not shown), there is an interstice between chip 1 and holder 90. An ointment-like heat-conductive resin 33 fills the interstice to place guided-wave circuit 5 in contact with holder 90 and to thus ensure the heat-radiation ability of chip 1. FIG. 24 shows the structure of guided-wave circuit at this stage, shown from the side of the endface of the input waveguide. As seen from this figure, chip 1 is mounted such that the position of cut portion 90a of holder 90 is in conformity with that of lower protective plate 80b. As has been described above, only the endfaces of guided-wave circuit chip 1 are in close contact with and supported by holder 90 through adhesive layer 34 in this guided-wave circuit module and, therefore, chip 1 can be mounted onto holder 90 without causing any change in the original radius of curvature of the warp.

Finally, an optical fiber array 100 is centered and fixed to the endfaces of input and output waveguide parts 5a and 5b protected by the aforementioned upper and lower protective plates 80a and 80b. Optical fiber array 100 is connected and fixed to upper protective plate a 80a and lower protective plate 80b and does not come in contact with holder 90.

Effects achieved by the guided-wave circuit module having the aforementioned structure according to this embodiment will be detailed below.

First, this module makes it possible to package the chip without application of stress to the chip. As has been described above, in this embodiment, only the endfaces of guided-wave circuit chip 1 are fixed to holder 90 by adhesive 34, while guided-wave circuit 5, sensitive to stress, is held in such a manner that it does not come in contact with holder 90 and adhesive 34. Thus, as shown in FIG. 24, chip 1 can be mounted to holder 90 without causing any change in the original radius of curvature of the warp of chip 1 and, further, any direct application of stress generated because of shrinkage of adhesive 34 during hardening to guided-wave circuit 5 of chip 1 can be prevented.

Consequently, any chip provided with a guided-wave circuit whose characteristic properties vary significantly upon application of stress can be mounted to the holder without causing any change in the initial properties of the guided-wave circuit, even if the chip has a significant warp.

Moreover, use of an adhesive having an elasticity, such as elastic adhesive, allows absorption of any displacement of both chip 1 and holder 90 possibly observed when there is mismatching in linear expansion coefficient between chip 1 and holder 90. Thus, any application of stress to guided-wave circuit chip 1 can be prevented. Therefore, use of an elastic adhesive can provide a guide-wave circuit having a further improved heat stability.

Secondly, the guided-wave circuit module according to the present invention permits accurate polishing of the endfaces.

As shown in FIGS. 21 and 24, guided-wave circuit chip 1 is equipped with protective plates 80a and 80b positioned just above and just below input and output waveguide parts 5a and 5b fixed by adhesive 14. As a result, any breakage of the endfaces of the waveguides and any formation of defects on the endfaces can be eliminated by polishing the endfaces of the waveguides. In this respect, a hard adhesive having a Young's modulus of 150 kg/mm$^2$ is used as the adhesive for fixing guided-wave circuit chip 1 to protective plates 80a and 80b, the polishing accuracy of the endfaces of the waveguide can substantially be enhanced. In fact, when a guided-wave circuit produced according to this embodiment is connected to optical fibers, the excess loss (an additional loss other than the fiber connection loss observed due to the mismatching in the spot diameter between the guided-wave circuit and the optical fiber) was not more than 0.05 dB/connection and the return loss was 47 dB. Thus, the embodiment can allow fiber connection having a low connection loss and a high return loss.

Further, in this embodiment, optical fibers 2 come in contact with only the endfaces of guided-wave circuit 1 and upper and lower protective plates 80a and 80b, while they do not come in contact with holder 90 after connecting an fixing optical fiber array 100 to the chip. Therefore, the following effect can be anticipated in addition to the foregoing effect. Any mismatching in the linear expansion coefficient observed between chip 1 and holder 90 does not affect optical fiber array 100 at all and, accordingly, the temperature-dependency of the fiber connection loss is guide low.

Thirdly, this embodiment permits the support of chip 1 without applying any stress to chip 1 and allows for chip 1 to radiate heat. More specifically, guided-wave circuit chip 1 having a warp is mounted and fixed to holder 90 in such a manner that the edges of chip 1 are in contact with the holder and, as a result, an interstice is formed between central portion 1b and holder 90. The entire bottom surface of chip 1 can be in thermal contact with holder 90 by filling this interstice with ointment-like heat conductive resin 33 without applying any stress to chip 1. Therefore, if holder 90 comprises a material having an excellent heat conductivity such as a copper block, guided-wave circuit 1 can effectively radiate heat.

As has been described above, the guided-wave circuit module according to this embodiment makes it possible to fix a large scale guided-wave circuit chip having a warp of a finite radius of curvature to a frame structure without applying stress generated during the packaging of the chip. As a result, the chip can be packaged while maintaining a sufficient mechanical strength and without deterioration of characteristic properties of the guided-wave circuit. At the same time, optical fibers can be connected to the chip while maintaining a very low fiber connection loss and a very high return loss since the endfaces of the light input and output waveguides can be accurately polished. Further, an efficient heat radiation from the chip can optionally be ensured while simultaneously maintaining the chip in the stress-free condition.

Embodiment 8

Figure 25:
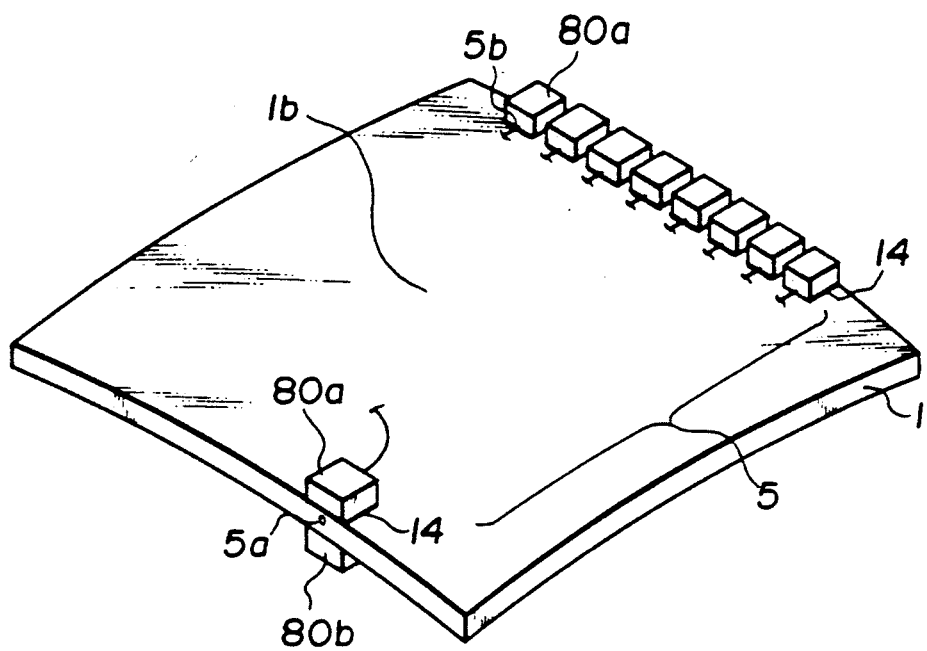
FIG. 25 is a perspective view showing a guided-wave circuit chip constituting an eighth embodiment of the guided-wave circuit module according to the present invention.
Figure 26:
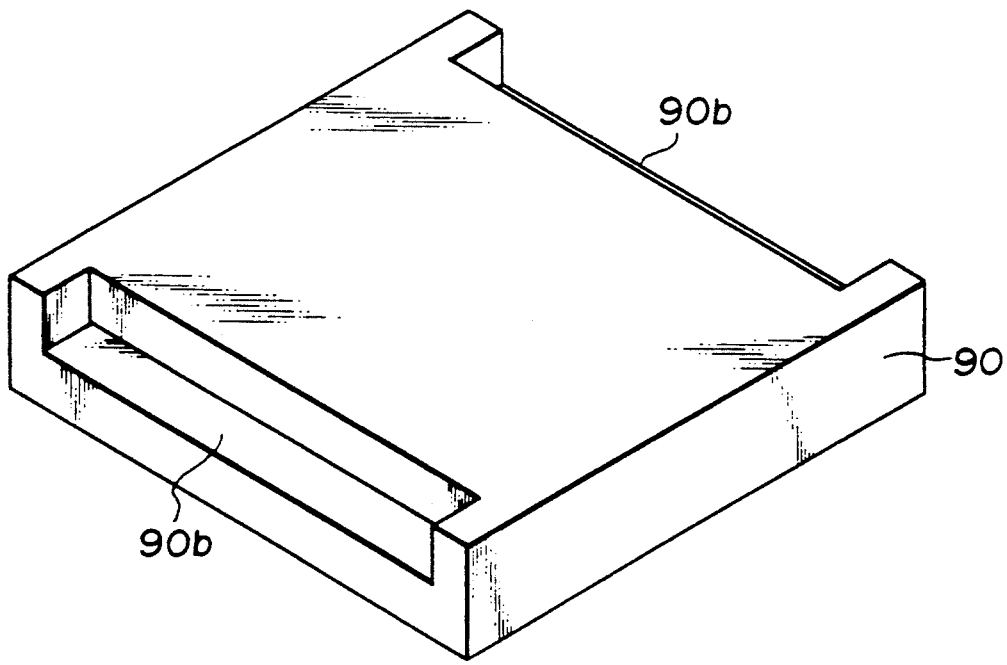
FIG. 26 is a perspective view showing a holder constituting the eighth embodiment of the guided-wave circuit module according to the present invention.
Figure 27:
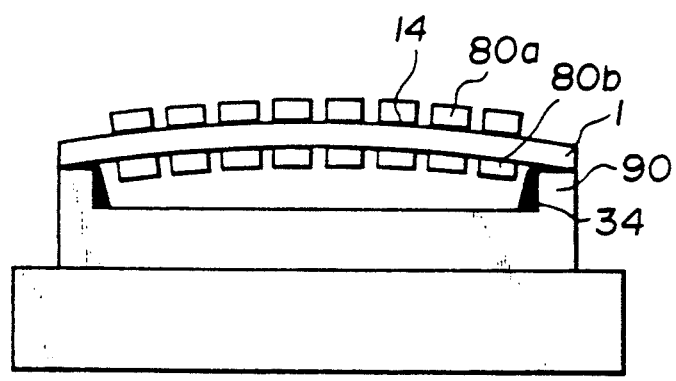
FIG. 27 is a side view of the guided-wave circuit module according to the eighth embodiment of the present invention.

FIGS. 25 to 27 show diagrams for explaining the guided-wave circuit module according to an eighth embodiment of the present invention. This embodiment differs from the embodiment 7 in that the guided-wave circuit of this embodiment is provided with a large number of output waveguides.

FIG. 25 is a diagram for explaining guided-wave circuit chip 1 in which, for the sake of simplicity, the pattern of guided-wave circuit 5 formed on chip 1 is omitted. This guided-wave circuit 5 of chip 1 is an example of a structure comprising 1×N splitters, which can split an incident light beam introduced through a single input waveguide part 5a into multiple light beams, for instance 128 beams and output them to output waveguides by connecting 3 dB couplers in a multiple-layer structure. This embodiment differs from the embodiment 7 in that the number of output waveguides is increased and the output waveguides are distributed over almost the whole region of the endface of the chip. When protective plates 80a and 80b are placed on the upper and bottom surface of the chip on which output waveguide part 5b of guided-wave circuit chip 1 is present, the warp in the direction perpendicular to the propagated light in the guided-wave circuit is not also negligible in addition to the warp in the direction of the propagated light. For this reason, protective plates 80a and 80b fitted to output waveguide part 5b are divided into pieces having a size such that the warp of the chip can be neglected in this embodiment. In the case of 1×128 splitters, for instance, output waveguide 5b is divided into 8 groups each comprising 16 pieces and a set of protective plates 80a and 80b are fitted to the chip for each group with adhesive 14. If the distance between the neighboring waveguides in each group is set to 250 μm, the width of each group is 4 mm and thus the warp of the chip can be neglected within each group.

FIG. 26 shows the structure of holder 90 in which level differences 90b like resesses are formed at positions corresponding to those at which protective plates 80a and 80b are fitted to guided-wave circuit chip 1.

FIG. 27 shows the structure of the guided-wave circuit module observed from the output waveguide side when guided-wave circuit chip 1 is fixed to holder 90. Chip 1 is fixed to holder 90 by placing the edges of the chip in contact with holder 90 through adhesive 34 like the seventh embodiment. As has been described above, protective plates 80a and 80b for output waveguide part 5b are divided into pieces having a size such that the warp of the chip can be neglected in this embodiment and accordingly, the chip can be packaged without changing the initial radius of curvature of the warp.

This structure allows for the guided-wave circuit module according to this embodiment to satisfy the foregoing requirements discussed in connection with the first embodiment, i, e., accurate alignment of optical fibers and waveguides; accurate polishing of the endfaces of waveguides; packaging without applying any stress to the chip; and excellent heat radiation ability.

Embodiment 9

Figure 28:
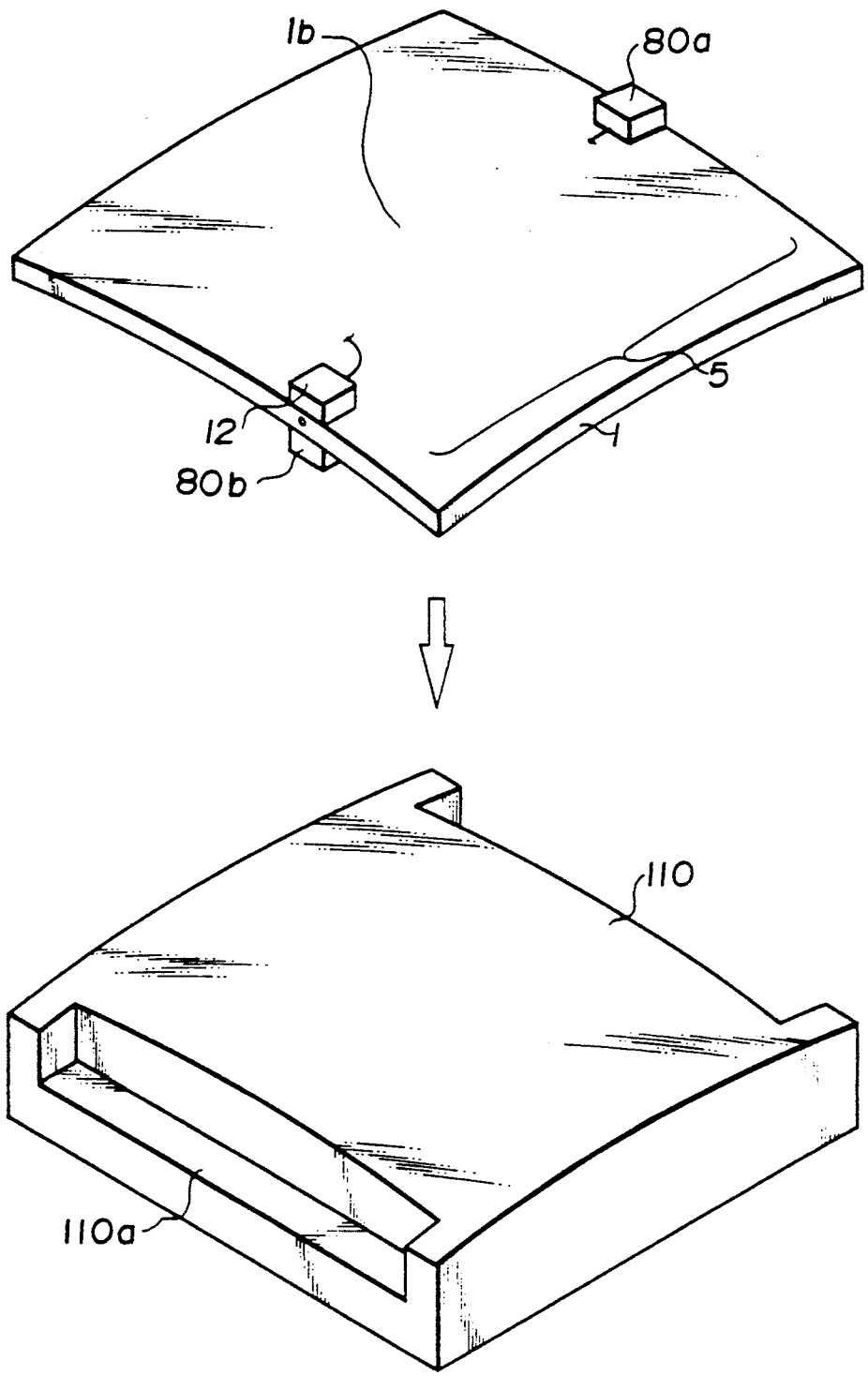
FIG. 28 is an exploded perspective view showing a guided-wave circuit module according to a ninth embodiment of the present invention.
Figure 29:
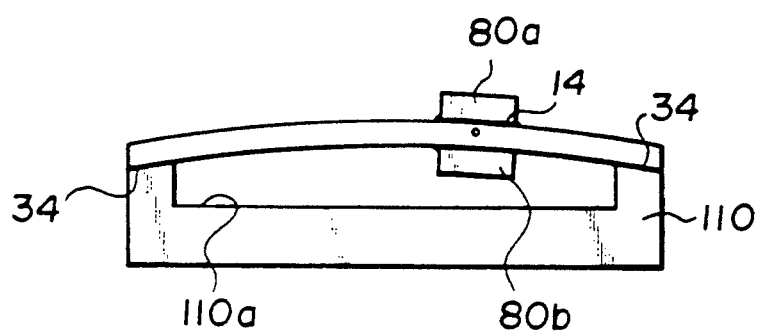
FIG. 29 is a side view of the guided-wave circuit module according to the ninth embodiment.

FIGS. 28 and 29 show a ninth embodiment according to the present invention. The ninth embodiment differs from the seventh and eighth embodiments in that a holder 110 has a surface having a curvature in conformity with the radius of curvature of the warp of guided-wave circuit chip 1 and that of central portion 1b of chip 1, on which guided-wave circuit 5 (pattern thereof is not shown) is formed, is in direct contact with the surface of holder 110. Further, the edges of chip 1 are fixed to holder 110 with adhesive 34. Such a structure makes it possible to package chip 1 without applying any stress to the chip and to further enhance the heat radiation effect as compared with the embodiments 7 and 8.

Embodiment 10

The embodiment 10 is an example of the wave-guiding optical component according to the present invention. The wave-guiding optical component according to this embodiment comprises, as shown in FIG. 30, a guided-wave circuit module 120 and an optical fiber array 130 connected to input and output terminals of the module.

The foregoing guided-wave circuit module 120 may, for instance, be guided-wave circuit module 43 according to the embodiment 3 (see FIGS. 9, 11 and 12) described above. In this guided-wave circuit module 43, holders 40 and 41 comprise boroslilicate glass. This material has a linear expansion coefficient approximately identical with that of silicon as a material for the chip and can transmit light up to the UV region. A UV-curable adhesive was used as adhesive 14 since these holders 40 and 41 are composed of a material transparent to UV light rays. Further, a hard adhesive having a Young's modulus of 190 kg/mm$^2$ was used taking into consideration polishing of the endfaces of the guided-wave circuit. UV-curable adhesive 14 as a fixing agent is uniformly applied to the periphery of guided-wave circuit chip 1 as shown in FIG. 12. The both endfaces of guided-wave circuit module 43 are accurately ground prior to the fiber connection.

Figure 31:
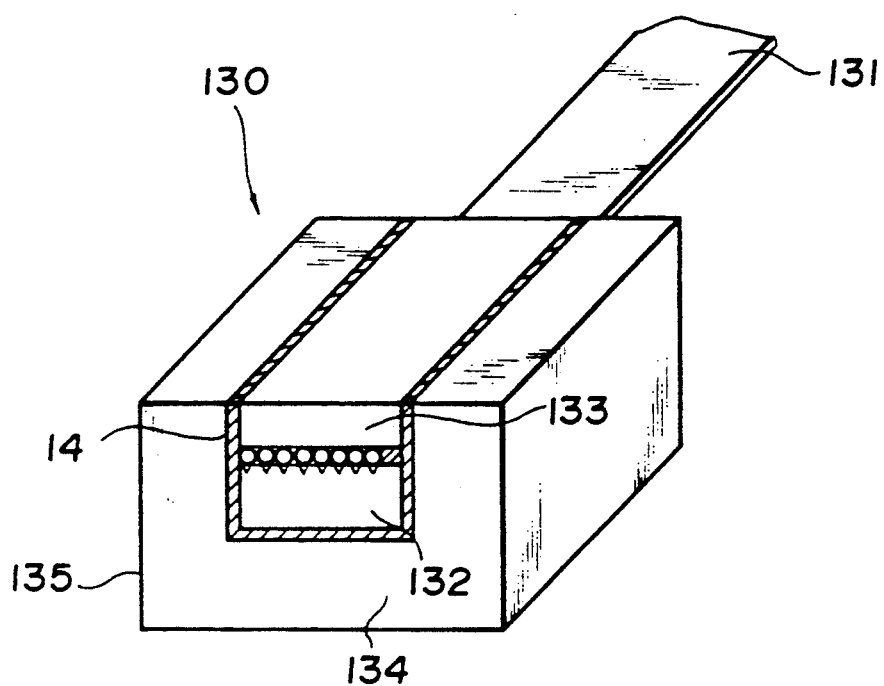
FIG. 31 relates to the tenth embodiment according to the present invention and is a perspective view showing an optical fiber array constituting the wave-guiding optical component according to the present invention.

Optical fiber array 130 to be connected to guided-wave circuit module 120 (43) comprises, as shown in FIG. 31, an 8-port ribbon fiber which is fixed to a support plate 132, a fixing plate 133 and a terminal frame 134 such that the edges thereof are exposed. The foregoing support plate 132, fixing plate 133 and terminal frame form a terminal holder 135. In this optical fiber array 130, fiber 131 is sandwiched between support plate 132 having grooves for receiving fibers and fixing plate 133 and fixed with adhesive 14. An assembly comprising these fiber 131, support plate 132 and fixing plate 133 is engaged with a concave portion of frame 134 and fixed to terminal plate 134 with adhesive 14. The foregoing support plate 132, fixing plate 133 and frame 134 are made of borosilicate glass and are fixed with UV-curable adhesive 14 having a Young's modulus of 150 kg/mm$^2$ as in the case of holders 40 and 41 for the guided-wave circuit chip. The endfaces of the optical fiber is also accurately polished prior to the fiber connection.

Figure 30:
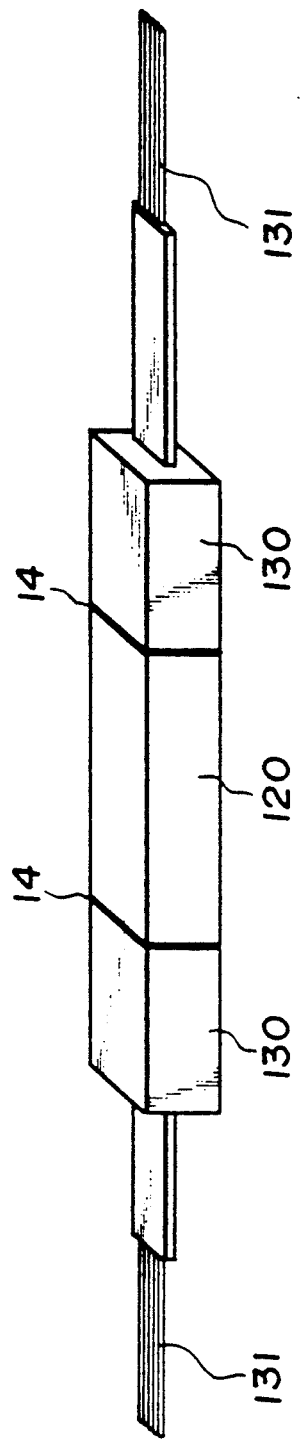
FIG. 30 relates to a tenth embodiment according to the present invention and is a perspective view showing an embodiment of a wave-guiding optical component of the present invention.

FIG. 30 shows the appearance of a wave-guiding optical part which comprises guided-wave circuit module 120 (43) and optical fiber array 130 connected to the module through UV-curable adhesive layer 14. The alignment of optical fiber array 130 with respect to guided-wave circuit module 120 is completed within a short time period if an automatic alignment apparatus is used, after dropwise addition of UV-curable adhesion 14 to the interface to be connected. The optical fiber connection can easily be carried out by irradiating the resulting assembly with UV light rays after the alignment. Adhesives are not restricted to specific adhesives already disclosed in connection with the present invention, but generally those which are hardened through application of heat or UV light rays. Preferred are those hardened through irradiation of UV light rays, so called UV-curable adhesives, because of high curing speed from the viewpoint of process.

The Young's modulus of the adhesives used in the present invention is preferably 150 kg/mm² or higher, as already mentioned above. This is because if the Young's modulus of the adhesive is less than 100 kg/mm², the average and scattering of the fiber connection loss are high, while if an adhesive having a Young's modulus ranging from 100 to 150 kg/mm² is used, the average of the fiber connection loss is relatively low, but the scattering of such adhesives is relatively high. On the other hand, if an adhesive having a Young's modulus of 150 kg/mm² or higher is used, the average and scattering of the fiber connection loss are low and, therefore, a wave-guiding optical component having desired characteristic properties can be obtained. In this respect, the term "Young's modulus" used herein means the storage elastic modulus determined at orbinary temperature by a dynamic method (JIS K7198).

The wave-guiding optical component shown in FIG. 30 comprises, as has been described above, guided-wave circuit module 120 and optical fiber array 130 which are connected with a UV-curable epoxy type adhesive 14 having a refractive index approximately identical to that of silica-glass after the endfaces thereof to be connected are polished. The increase in the loss due to the connection was 0.12 dB on the average and the maximum value thereof was low on the order 0.18 dB.

The present invention has been explained with reference to specific embodiments, but the invention is by no means limited to these specific embodiments. In the foregoing embodiments, the present invention has been explained while taking a silicon chip provided thereon with a silica-based type guided-wave circuit as an example of the guided-wave circuit chip, but the invention is not restricted to such embodiments. The present invention can be applied to any guided-wave circuit whose circuit characteristics are affected by the stress change in the chip during packaging and thus desired effects can be anticipated. In addition, UV-curable adhesives are used for fixing the guided-wave circuit chip to the holder in the foregoing embodiments, but the fixing agent usable in the present invention further include, for instance, a variety of adhesives such as heat-hardening adhesive and cold-setting adhesives and a solder. Further the holder, made of a borosilicate glass, is used in the foregoing embodiments, but it may be formed from other various materials, for instance, a metal material such as Koval. If the holder is made of a metal material, the connection of the optical fiber array thereto can be carried out by a laser welding technique.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A guided-wave circuit module comprising:
   a guided-wave circuit chip comprising an input waveguide part and an output waveguide part which include respectively linear optical waveguides, and a guided-wave circuit part which has a curved guided-wave circuit having a predetermined function and which is positioned between the input waveguide part and the output waveguide part; and
   a holder for supporting the guided-wave circuit chip;
   wherein the guided-wave circuit part does not come into contact with the holder, at least each part of the input and output waveguide parts of the guided-wave circuit chip are fixed to the holder with a fixing agent, and at least portions of the holder in contact with the guided-wave circuit chip are made of an inelastic and inflexible material.

2. The guided-wave circuit module according to claim 1, wherein the input and output waveguide parts each have endfaces, the guided-wave circuit chip does not have a significant warp at least in a direction along the endfaces of the input and output waveguide parts, the holder covers upper and lower sides of the chip and the fixing agent which adheres the holder to the input and output waveguide parts has a Young's modulus of not less than 150 kg/mm².

3. The guided-wave circuit module according to claim 1, wherein a portion of the holder not in contact with the guided-wave circuit chip comprises an elastic and inflexible material.

4. The guided-wave circuit module according to claim 1, wherein the input and output waveguide parts each have endfaces, the guided-wave circuit chip have upper and lower surfaces at the input and output waveguide parts and a warp having a finite radius of curvature at least in the direction along the endfaces of the input and output waveguide parts; and
   at least one protective plate is fitted to the upper and lower chip surfaces at the input and output waveguide parts of the guided-wave circuit chip through a fixing agent.

5. A guided-wave circuit module comprising:
   a guided-wave circuit chip comprising an input waveguide part and an output waveguide part at endfaces of the chip and a guided-wave circuit part which has a predetermined function and is positioned in the middle of the chip, the guided-wave circuit chip having a plurality of surfaces as the input and output waveguide parts and a finite radius of curvature; and
   a holder for supporting the guided-wave circuit chip,
   wherein protective plates are fitted to the plurality of chip surfaces at the input and output waveguide parts of the guided-wave circuit chip through a first fixing agent, a surface of the chip holder being formed into a curved shape having a radius of curvature approximately equal to the radius of curvature of the guided-wave circuit chip, a bottom surface of the guided-wave circuit chip being in direct contact with the surface of the chip holder and parts of the endfaces of the guided-wave circuit chip being fixed to the holder with a second fixing agent.

6. The guided-wave circuit module according to claim 5, wherein the second fixing agent for fixing the chip to the holder has an elasticity.

7. The guided-wave circuit module according to claim 5, wherein the Young's modulus of the first fixing agent for adhering the protective plates to the chip is not less than 150 kg/mm².

8. A guided-wave circuit module comprising:
   a first frame having a first surface; and
   a guided-wave circuit chip having a first radius of curvature, first and second surfaces, an input waveguide portion at a first endface of the chip and an output waveguide portion at a second endface of the chip, wherein the first radius of curvature of the chip causes the chip to contact the first frame at the first and second endfaces of the chip.

9. The guided-wave circuit module according to claim 8, wherein a fixing agent adheres the first surface of the chip to the first frame at the first and second endfaces.

10. The guided-wave circuit module according to claim 8, further comprising a second frame means for contacting the second surface of the chip at the first and second endfaces of the chip.

11. The guided-wave circuit module according to claim 10, wherein a fixing agent adheres the first surface of the chip to the first frame at the first and second endfaces.

12. The guided-wave circuit module according to claim 11, wherein the fixing agent adheres the second surface of the chip to the second frame means at the first and second endfaces.

13. The guided-wave circuit module according to claim 12, wherein the fixing agent has a Young's modulus not less than 150 kg/mm$^2$.

14. The guided-wave circuit module according to claim 10, wherein the first frame and the second frame means each have an inelastic portion and an elastic portion, and the inelastic portion of each of the first frame and the second frame means contacts the chip at the first and second endfaces of the chip.

15. A guided-wave circuit module comprising:
a frame having a first surface;
a guided-wave circuit chip having a first finite radius of curvature, first and second surfaces, an input waveguide portion at a first endface of the chip and an output waveguide portion at a second endface of the chip, the chip contacting the first surface of the frame at a plurality of points on the second surface determined by the first finite radius of curvature of the chip and the first surface of the frame;
at least one first protector plate adhered to the first surface of the chip at the first endface with a first fixing agent; and
at least one second protector plate adhered to the second surface of the chip at the second endface with the first fixing agent.

16. The guided-wave circuit module according to claim 15, wherein the first fixing agent has a Young's modulus not less than 150 kg/mm$^2$.

17. The guided-wave circuit module according to claim 15, wherein the chip is fixed to the first surface of the frame with a second fixing agent at at least one of the plurality of points.

18. The guided-wave circuit module according to claim 17, wherein the second fixing agent is an elastic adhesive.

19. The guided-wave circuit module according to claim 15, wherein the chip includes a second finite radius of curvature.

20. The guided-wave circuit module according to claim 19, further comprising a heat-conductive resin disposed in an interstice formed between the chip and the first surface of the frame, the interstice defined by the first radius of curvature of the chip and the first surface of the frame and the second radius of curvature of the chip and the first surface of the frame.

21. A guided-wave circuit module comprising:
a guided-wave circuit chip comprising an input waveguide part and an output waveguide part which include respectively linear optical waveguides, and a guided-wave circuit part which has a curved guided-wave circuit having a predetermined function and which is positioned between the input waveguide part and the output waveguide part; and
a holder for supporting the guided-wave circuit chip;
wherein the guided-wave circuit part does not come into contact with the holder, at least each part of the input and output waveguide parts of the guided-wave circuit chip are fixed to the holder with a fixing agent, and at least portions of the holder in contact with the guided-wave circuit chip are made of an inelastic material; and
wherein the input and output waveguide parts each have endfaces, the guided-wave circuit chip does not have a significant warp at least in a direction along the endfaces of the input and output waveguide parts, the holder covers upper and lower sides of the chip and the fixing agent which adheres the holder to the input and output waveguide parts has a Young's modulus of not less than 150 kg/mm$^2$.

22. A guided-wave circuit module comprising:
a guided-wave circuit chip comprising an input waveguide part and an output waveguide part which include respectively linear optical waveguides, and a guided-wave circuit part which has a curved guided-wave circuit having a predetermined function and which is positioned between the input waveguide part and the output waveguide part; and
a holder for supporting the guided-wave circuit chip;
wherein the guided-wave circuit part does not come into contact with the holder, at least each part of the input and output waveguide parts of the guided-wave circuit chip are fixed to the holder with a fixing agent, and at least portions of the holder in contact with the guided-wave circuit chip are made of an inelastic material; and
wherein the input and output waveguide parts each have endfaces, the guided-wave circuit chip have upper and lower surfaces at the input and output waveguide parts and a warp having a finite radius of curvature at least in the direction along the endfaces of the input and output waveguide parts; and
at least one protective plate is fitted to the upper and lower chip surfaces at the input and output waveguide parts of the guided-wave circuit chip through a fixing agent.

* * * * *